United States Patent
Kamiya et al.

(10) Patent No.: US 10,715,375 B2
(45) Date of Patent: Jul. 14, 2020

(54) MODULATION METHOD, DECODING METHOD, MODULATION DEVICE, AND DEMODULATION DEVICE

(71) Applicant: NEC CORPORATION, Tokyo (JP)

(72) Inventors: Norifumi Kamiya, Tokyo (JP); Mamoru Sawahashi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/471,958

(22) PCT Filed: Dec. 21, 2016

(86) PCT No.: PCT/JP2016/088129
§ 371 (c)(1),
(2) Date: Jun. 20, 2019

(87) PCT Pub. No.: WO2018/116411
PCT Pub. Date: Jun. 28, 2018

(65) Prior Publication Data
US 2020/0092155 A1    Mar. 19, 2020

(51) Int. Cl.
*H04L 27/36* (2006.01)
*H04L 27/34* (2006.01)

(52) U.S. Cl.
CPC ............... *H04L 27/3411* (2013.01)

(58) Field of Classification Search
CPC .................................. H04L 27/3411
USPC ........................................ 375/298
See application file for complete search history.

(56) References Cited

U.S. PATENT DOCUMENTS

| | | | |
|---|---|---|---|
| 5,005,186 A * | 4/1991 | Aono ............ | H04L 27/38 375/328 |
| 8,958,492 B1 | 2/2015 | Kamiya et al. | |
| 2005/0207507 A1* | 9/2005 | Mitsutani ...... | H03M 13/25 375/261 |
| 2009/0161786 A1 | 6/2009 | Nakagawa et al. | |

(Continued)

FOREIGN PATENT DOCUMENTS

| | | |
|---|---|---|
| WO | 2007/074524 A1 | 7/2007 |
| WO | 2011/068119 A1 | 6/2011 |
| WO | 2013/161801 A1 | 10/2013 |

OTHER PUBLICATIONS

Norifumi Kamiya et al., "Pilot-Symbol Assisted and Code-Aided Phase Error Estimation for High-Order QAM Transmission" IEEE Transactions on Communications, Oct. 2013, pp. 4369-4380, vol. 61, No. 10.

(Continued)

*Primary Examiner* — Don N Vo
(74) *Attorney, Agent, or Firm* — Sughrue Mion, PLLC

(57) ABSTRACT

A modulation device includes a mapping circuit configured to map information bits to signal points on a plurality of concentric rings, when a signal space arrangement in which the number of signal points on all of the plurality of rings is the same is used as a basis, reduce the number of signal points on an innermost ring or a plurality of rings from inner to outer rings from among the plurality of rings, generate a new ring outside the signal space arrangement used as the basis, and arrange, on the generated ring, signal points which achieve the same frequency utilization efficiency as that of the signal space arrangement used as the basis.

15 Claims, 21 Drawing Sheets

(56) References Cited

U.S. PATENT DOCUMENTS

2015/0085960 A1 3/2015 Kamiya et al.
2016/0072523 A1* 3/2016 Muhammad .......... H04L 1/0041
                                                        714/776
2019/0386722 A1* 12/2019 Murakami .............. H04L 25/03

OTHER PUBLICATIONS

E. Eleftheriou et al., "Low-Density Parit-Check Codes for Digital Subcriber Lines", Proc. IEEE ICC2002, 2002, pp. 1752-1757.
M. Assad Tariq et al., "Performance of Circular QAM Constellations with Time Varying Phase Noise", IEEE 23rd International Symposium on Personal, Indoor and Mobile Radio Communications—(PIMRC), 2012, pp. 2365-2370.
Yang Li et al., "Design of Circular Signal Constellations in the Presence of Phase Noise", Proc. WICOM2008, IEEE, 2008, pp. 1-8.
Lianjun Deng et al., "Performance of Circular QAM Constellations Using Partial Channel Coding with Parallel Double Gray Mapping", IEICE Technical Report, Oct. 13, 2016, 8 pgs., vol. 116, No. 257.
International Search Report for PCT/JP2016/088129 dated Mar. 21, 2017 (PCT/ISA/210).
Communication dated May 19, 2020, from the Japanese Patent Office in application No. 2018-557458.
Bin Zheng et al., "Circular QAM Constellations with Robustness for Time-Varying Phase Noise", The Institute of Electronics, Information and Communication Engineers, Technical Report, vol. 116, No. 394, RCS2016-272 2017, pp. 211-216 (6 pages total).

\* cited by examiner

| | R1 (16 SIGNAL POINTS) | | R2 (16 SIGNAL POINTS) | | R3 (16 SIGNAL POINTS) | | R4 (16 SIGNAL POINTS) | |
|---|---|---|---|---|---|---|---|---|
| | AMPLITUDE | PHASE | AMPLITUDE | PHASE | AMPLITUDE | PHASE | AMPLITUDE | PHASE |
| 1 | 0000 | 000000 | 0001 | 000000 | 0011 | 000000 | 0010 | 000000 |
| 2 | | 000001 | | 000001 | | 000001 | | 000001 |
| 3 | | 000011 | | 000011 | | 000011 | | 000011 |
| 4 | | 000010 | | 000010 | | 000010 | | 000010 |
| 5 | | 000100 | | 000100 | | 000100 | | 000100 |
| 6 | | 000101 | | 000101 | | 000101 | | 000101 |
| 7 | | 000111 | | 000111 | | 000111 | | 000111 |
| 8 | | 000110 | | 000110 | | 000110 | | 000110 |
| 9 | | 001100 | | 001100 | | 001100 | | 001100 |
| 10 | | 001101 | | 001101 | | 001101 | | 001101 |
| 11 | | 001111 | | 001111 | | 001111 | | 001111 |
| 12 | | 001110 | | 001110 | | 001110 | | 001110 |
| 13 | | 001000 | | 001000 | | 001000 | | 001000 |
| 14 | | 001001 | | 001001 | | 001001 | | 001001 |
| 15 | | 001011 | | 001011 | | 001011 | | 001011 |
| 16 | | 001010 | | 001010 | | 001010 | | 001010 |

Fig. 10A

| | R5 (64 SIGNAL POINTS) | | R6, R7, R8, R9, R10, R11, R12, R13, R14, R15, R16 (64 SIGNAL POINTS) | | | R17 (64 SIGNAL POINTS) | | R18 (64 SIGNAL POINTS) | | R19 (64 SIGNAL POINTS) | |
|---|---|---|---|---|---|---|---|---|---|---|---|
| | AMPLI-TUDE | PHASE | | AMPLI-TUDE | PHASE | AMPLI-TUDE | PHASE | AMPLI-TUDE | PHASE | AMPLI-TUDE | PHASE |
| 1 | 0100 | 000000 | R6 | 0101 | 000000 | 0000 | 011000 | 0001 | 110000 | 0011 | 101000 |
| 2 | 0100 | 000001 | R7 | 0111 | 000001 | 0000 | 011001 | 0001 | 110001 | 0011 | 101001 |
| 3 | 0100 | 000011 | R8 | 0110 | 000011 | 0000 | 011011 | 0001 | 110011 | 0011 | 101011 |
| 4 | 0100 | 000010 | R9 | 1100 | 000010 | 0000 | 011010 | 0001 | 110010 | 0011 | 101010 |
| 5 | 0100 | 000100 | R10 | 1101 | 000100 | 0000 | 011100 | 0001 | 110100 | 0011 | 101100 |
| 6 | 0100 | 000101 | R11 | 1111 | 000101 | 0000 | 011101 | 0001 | 110101 | 0011 | 101101 |
| 7 | 0100 | 000111 | R12 | 1110 | 000111 | 0000 | 011111 | 0001 | 110111 | 0011 | 101111 |
| 8 | 0100 | 000110 | R13 | 1000 | 000110 | 0000 | 011110 | 0001 | 110110 | 0011 | 101110 |
| 9 | 0100 | 001100 | R14 | 1001 | 001100 | 0000 | 010100 | 0001 | 111100 | 0011 | 100100 |
| 10 | 0100 | 001101 | R15 | 1011 | 001101 | 0000 | 010101 | 0001 | 111101 | 0011 | 100101 |
| 11 | 0100 | 001111 | R16 | 1010 | 001111 | 0000 | 010111 | 0001 | 111111 | 0011 | 100111 |
| 12 | 0100 | 001110 | | | 001110 | 0000 | 010110 | 0001 | 111110 | 0011 | 100110 |
| 13 | 0100 | 001000 | | | 001000 | 0000 | 010000 | 0001 | 111000 | 0011 | 100000 |
| 14 | 0100 | 001001 | | | 001001 | 0000 | 010001 | 0001 | 111001 | 0011 | 100001 |
| 15 | 0100 | 001011 | | | 001011 | 0000 | 010011 | 0001 | 111011 | 0011 | 100011 |
| 16 | 0100 | 001010 | | | 001010 | 0000 | 010010 | 0001 | 111010 | 0011 | 100010 |
| 17 | 0100 | 011000 | | | 011000 | 0000 | 110000 | 0001 | 101000 | 0010 | 011000 |
| 18 | 0100 | 011001 | | | 011001 | 0000 | 110001 | 0001 | 101001 | 0010 | 011001 |
| 19 | 0100 | 011011 | | | 011011 | 0000 | 110011 | 0001 | 101011 | 0010 | 011011 |
| 20 | 0100 | 011010 | | | 011010 | 0000 | 110010 | 0001 | 101010 | 0010 | 011010 |
| 21 | 0100 | 011100 | | | 011100 | 0000 | 110100 | 0001 | 101100 | 0010 | 011100 |
| 22 | 0100 | 011101 | | | 011101 | 0000 | 110101 | 0001 | 101101 | 0010 | 011101 |
| 23 | 0100 | 011111 | | | 011111 | 0000 | 110111 | 0001 | 101111 | 0010 | 011111 |
| 24 | 0100 | 011110 | | | 011110 | 0000 | 110110 | 0001 | 101110 | 0010 | 011110 |
| 25 | 0100 | 010100 | | | 010100 | 0000 | 111100 | 0001 | 100100 | 0010 | 010100 |
| 26 | 0100 | 010101 | | | 010101 | 0000 | 111101 | 0001 | 100101 | 0010 | 010101 |
| 27 | 0100 | 010111 | | | 010111 | 0000 | 111111 | 0001 | 100111 | 0010 | 010111 |
| 28 | 0100 | 010110 | | | 010110 | 0000 | 111110 | 0001 | 100110 | 0010 | 010110 |
| 29 | 0100 | 010000 | | | 010000 | 0000 | 111000 | 0001 | 100000 | 0010 | 010000 |
| 30 | 0100 | 010001 | | | 010001 | 0000 | 111001 | 0001 | 100001 | 0010 | 010001 |
| 31 | 0100 | 010011 | | | 010011 | 0000 | 111011 | 0001 | 100011 | 0010 | 010011 |
| 32 | 0100 | 010010 | | | 010010 | 0000 | 111010 | 0001 | 100010 | 0010 | 010010 |

Fig. 10B

| | R5 (64 SIGNAL POINTS) | | R6, R7, R8, R9, R10, R11, R12, R13, R14, R15, R16 (64 SIGNAL POINTS) | | R17 (64 SIGNAL POINTS) | | R18 (64 SIGNAL POINTS) | | R19 (64 SIGNAL POINTS) | |
|---|---|---|---|---|---|---|---|---|---|---|
| | AMPLITUDE | PHASE | AMPLITUDE | PHASE | AMPLITUDE | PHASE | AMPLITUDE | PHASE | AMPLITUDE | PHASE |
| 33 | 0100 | 110000 | | 110000 | 0000 | 101000 | 0011 | 011000 | 0010 | 110000 |
| 34 | 0100 | 110001 | | 110001 | 0000 | 101001 | 0011 | 011001 | 0010 | 110001 |
| 35 | 0100 | 110011 | | 110011 | 0000 | 101011 | 0011 | 011011 | 0010 | 110011 |
| 36 | 0100 | 110010 | | 110010 | 0000 | 101010 | 0011 | 011010 | 0010 | 110010 |
| 37 | 0100 | 110100 | | 110100 | 0000 | 101100 | 0011 | 011100 | 0010 | 110100 |
| 38 | 0100 | 110101 | | 110101 | 0000 | 101101 | 0011 | 011101 | 0010 | 110101 |
| 39 | 0100 | 110111 | | 110111 | 0000 | 101111 | 0011 | 011111 | 0010 | 110111 |
| 40 | 0100 | 110110 | | 110110 | 0000 | 101110 | 0011 | 011110 | 0010 | 110110 |
| 41 | 0100 | 111100 | | 111100 | 0000 | 100100 | 0011 | 010100 | 0010 | 111100 |
| 42 | 0100 | 111101 | | 111101 | 0000 | 100101 | 0011 | 010101 | 0010 | 111101 |
| 43 | 0100 | 111111 | | 111111 | 0000 | 100111 | 0011 | 010111 | 0010 | 111111 |
| 44 | 0100 | 111110 | | 111110 | 0000 | 100110 | 0011 | 010110 | 0010 | 111110 |
| 45 | 0100 | 111000 | | 111000 | 0000 | 100000 | 0011 | 010000 | 0010 | 111000 |
| 46 | 0100 | 111001 | | 111001 | 0000 | 100001 | 0011 | 010001 | 0010 | 111001 |
| 47 | 0100 | 111011 | | 111011 | 0000 | 100011 | 0011 | 010011 | 0010 | 111011 |
| 48 | 0100 | 111010 | | 111010 | 0000 | 100010 | 0011 | 010010 | 0010 | 111010 |
| 49 | 0100 | 101000 | | 101000 | 0001 | 011000 | 0011 | 110000 | 0010 | 101000 |
| 50 | 0100 | 101001 | | 101001 | 0001 | 011001 | 0011 | 110001 | 0010 | 101001 |
| 51 | 0100 | 101011 | | 101011 | 0001 | 011011 | 0011 | 110011 | 0010 | 101011 |
| 52 | 0100 | 101010 | | 101010 | 0001 | 011010 | 0011 | 110010 | 0010 | 101010 |
| 53 | 0100 | 101100 | | 101100 | 0001 | 011100 | 0011 | 110100 | 0010 | 101100 |
| 54 | 0100 | 101101 | | 101101 | 0001 | 011101 | 0011 | 110101 | 0010 | 101101 |
| 55 | 0100 | 101111 | | 101111 | 0001 | 011111 | 0011 | 110111 | 0010 | 101111 |
| 56 | 0100 | 101110 | | 101110 | 0001 | 011110 | 0011 | 110110 | 0010 | 101110 |
| 57 | 0100 | 100100 | | 100100 | 0001 | 010100 | 0011 | 111100 | 0010 | 100100 |
| 58 | 0100 | 100101 | | 100101 | 0001 | 010101 | 0011 | 111101 | 0010 | 100101 |
| 59 | 0100 | 100111 | | 100111 | 0001 | 010111 | 0011 | 111111 | 0010 | 100111 |
| 60 | 0100 | 100110 | | 100110 | 0001 | 010110 | 0011 | 111110 | 0010 | 100110 |
| 61 | 0100 | 100000 | | 100000 | 0001 | 010000 | 0011 | 111000 | 0010 | 100000 |
| 62 | 0100 | 100001 | | 100001 | 0001 | 010001 | 0011 | 111001 | 0010 | 100001 |
| 63 | 0100 | 100011 | | 100011 | 0001 | 010011 | 0011 | 111011 | 0010 | 100011 |
| 64 | 0100 | 100010 | | 100010 | 0001 | 010010 | 0011 | 111010 | 0010 | 100010 |

Fig. 10C

| | R1 (16 SIGNAL POINTS) | | R2 (16 SIGNAL POINTS) | | R3 (16 SIGNAL POINTS) | | R4 (16 SIGNAL POINTS) | |
|---|---|---|---|---|---|---|---|---|
| | AMPLITUDE | PHASE | AMPLITUDE | PHASE | AMPLITUDE | PHASE | AMPLITUDE | PHASE |
| 1 | 0000 | 000000 | 0001 | 000000 | 0011 | 000000 | 0010 | 000000 |
| 2 | | 000001 | | 000001 | | 000001 | | 000001 |
| 3 | | 000011 | | 000011 | | 000011 | | 000011 |
| 4 | | 000010 | | 000010 | | 000010 | | 000010 |
| 5 | | 000100 | | 000100 | | 000100 | | 000100 |
| 6 | | 000101 | | 000101 | | 000101 | | 000101 |
| 7 | | 000111 | | 000111 | | 000111 | | 000111 |
| 8 | | 000110 | | 000110 | | 000110 | | 000110 |
| 9 | | 001100 | | 001100 | | 001100 | | 001100 |
| 10 | | 001101 | | 001101 | | 001101 | | 001101 |
| 11 | | 001111 | | 001111 | | 001111 | | 001111 |
| 12 | | 001110 | | 001110 | | 001110 | | 001110 |
| 13 | | 001000 | | 001000 | | 001000 | | 001000 |
| 14 | | 001001 | | 001001 | | 001001 | | 001001 |
| 15 | | 001011 | | 001011 | | 001011 | | 001011 |
| 16 | | 001010 | | 001010 | | 001010 | | 001010 |

Fig. 11A

| | R5 (64 SIGNAL POINTS) | | R6, R7, R8, R9, R10, R11, R12, R13, R14, R15, R16 (64 SIGNAL POINTS) | | | R17 (64 SIGNAL POINTS) | | R18 (64 SIGNAL POINTS) | | R19 (64 SIGNAL POINTS) | |
|---|---|---|---|---|---|---|---|---|---|---|---|
| | AMPLITUDE | PHASE | | AMPLITUDE | PHASE | AMPLITUDE | PHASE | AMPLITUDE | PHASE | AMPLITUDE | PHASE |
| 1 | 0100 | 000000 | R6 | 0101 | 000000 | 0001 | 011000 | 0011 | 011000 | 0010 | 011000 |
| 2 | 0100 | 000001 | R7 | 0111 | 000001 | 0001 | 011001 | 0011 | 011001 | 0010 | 011001 |
| 3 | 0100 | 000011 | R8 | 0110 | 000011 | 0001 | 011011 | 0011 | 011011 | 0010 | 011011 |
| 4 | 0100 | 000010 | R9 | 1100 | 000010 | 0001 | 011010 | 0011 | 011010 | 0010 | 011010 |
| 5 | 0100 | 000100 | R10 | 1101 | 000100 | 0001 | 011100 | 0011 | 011100 | 0010 | 011100 |
| 6 | 0100 | 000101 | R11 | 1111 | 000101 | 0001 | 011101 | 0011 | 011101 | 0010 | 011101 |
| 7 | 0100 | 000111 | R12 | 1110 | 000111 | 0001 | 011111 | 0011 | 011111 | 0010 | 011111 |
| 8 | 0100 | 000110 | R13 | 1000 | 000110 | 0001 | 011110 | 0011 | 011110 | 0010 | 011110 |
| 9 | 0100 | 001100 | R14 | 1001 | 001100 | 0001 | 010100 | 0011 | 010100 | 0010 | 010100 |
| 10 | 0100 | 001101 | R15 | 1011 | 001101 | 0001 | 010101 | 0011 | 010101 | 0010 | 010101 |
| 11 | 0100 | 001111 | R16 | 1010 | 001111 | 0001 | 010111 | 0011 | 010111 | 0010 | 010111 |
| 12 | 0100 | 001110 | | | 001110 | 0001 | 010110 | 0011 | 010110 | 0010 | 010110 |
| 13 | 0100 | 001000 | | | 001000 | 0001 | 010000 | 0011 | 010000 | 0010 | 010000 |
| 14 | 0100 | 001001 | | | 001001 | 0001 | 010001 | 0011 | 010001 | 0010 | 010001 |
| 15 | 0100 | 001011 | | | 001011 | 0001 | 010011 | 0011 | 010011 | 0010 | 010011 |
| 16 | 0100 | 001010 | | | 001010 | 0001 | 010010 | 0011 | 010010 | 0010 | 010010 |
| 17 | 0100 | 011000 | | | 011000 | 0000 | 011000 | 0011 | 110000 | 0010 | 110000 |
| 18 | 0100 | 011001 | | | 011001 | 0000 | 011001 | 0011 | 110001 | 0010 | 110001 |
| 19 | 0100 | 011011 | | | 011011 | 0000 | 011011 | 0011 | 110011 | 0010 | 110011 |
| 20 | 0100 | 011010 | | | 011010 | 0000 | 011010 | 0011 | 110010 | 0010 | 110010 |
| 21 | 0100 | 011100 | | | 011100 | 0000 | 011100 | 0011 | 110100 | 0010 | 110100 |
| 22 | 0100 | 011101 | | | 011101 | 0000 | 011101 | 0011 | 110101 | 0010 | 110101 |
| 23 | 0100 | 011111 | | | 011111 | 0000 | 011111 | 0011 | 110111 | 0010 | 110111 |
| 24 | 0100 | 011110 | | | 011110 | 0000 | 011110 | 0011 | 110110 | 0010 | 110110 |
| 25 | 0100 | 010100 | | | 010100 | 0000 | 010100 | 0011 | 111100 | 0010 | 111100 |
| 26 | 0100 | 010101 | | | 010101 | 0000 | 010101 | 0011 | 111101 | 0010 | 111101 |
| 27 | 0100 | 010111 | | | 010111 | 0000 | 010111 | 0011 | 111111 | 0010 | 111111 |
| 28 | 0100 | 010110 | | | 010110 | 0000 | 010110 | 0011 | 111110 | 0010 | 111110 |
| 29 | 0100 | 010000 | | | 010000 | 0000 | 010000 | 0011 | 111000 | 0010 | 111000 |
| 30 | 0100 | 010001 | | | 010001 | 0000 | 010001 | 0011 | 111001 | 0010 | 111001 |
| 31 | 0100 | 010011 | | | 010011 | 0000 | 010011 | 0011 | 111011 | 0010 | 111011 |
| 32 | 0100 | 010010 | | | 010010 | 0000 | 010010 | 0011 | 111010 | 0010 | 111010 |

Fig. 11B

| | R5 (64 SIGNAL POINTS) | | R6, R7, R8, R9, R10, R11, R12, R13, R14, R15, R16 (64 SIGNAL POINTS) | | R17 (64 SIGNAL POINTS) | | R18 (64 SIGNAL POINTS) | | R19 (64 SIGNAL POINTS) | |
|---|---|---|---|---|---|---|---|---|---|---|
| | AMPLI-TUDE | PHASE | AMPLI-TUDE | PHASE | AMPLI-TUDE | PHASE | AMPLI-TUDE | PHASE | AMPLI-TUDE | PHASE |
| 33 | 0100 | 110000 | | 110000 | 0000 | 110000 | 0001 | 110000 | 0010 | 101000 |
| 34 | 0100 | 110001 | | 110001 | 0000 | 110001 | 0001 | 110001 | 0010 | 101001 |
| 35 | 0100 | 110011 | | 110011 | 0000 | 110011 | 0001 | 110011 | 0010 | 101011 |
| 36 | 0100 | 110010 | | 110010 | 0000 | 110010 | 0001 | 110010 | 0010 | 101010 |
| 37 | 0100 | 110100 | | 110100 | 0000 | 110100 | 0001 | 110100 | 0010 | 101100 |
| 38 | 0100 | 110101 | | 110101 | 0000 | 110101 | 0001 | 110101 | 0010 | 101101 |
| 39 | 0100 | 110111 | | 110111 | 0000 | 110111 | 0001 | 110111 | 0010 | 101111 |
| 40 | 0100 | 110110 | | 110110 | 0000 | 110110 | 0001 | 110110 | 0010 | 101110 |
| 41 | 0100 | 111100 | | 111100 | 0000 | 111100 | 0001 | 111100 | 0010 | 100100 |
| 42 | 0100 | 111101 | | 111101 | 0000 | 111101 | 0001 | 111101 | 0010 | 100101 |
| 43 | 0100 | 111111 | | 111111 | 0000 | 111111 | 0001 | 111111 | 0010 | 100111 |
| 44 | 0100 | 111110 | | 111110 | 0000 | 111110 | 0001 | 111110 | 0010 | 100110 |
| 45 | 0100 | 111000 | | 111000 | 0000 | 111000 | 0001 | 111000 | 0010 | 100000 |
| 46 | 0100 | 111001 | | 111001 | 0000 | 111001 | 0001 | 111001 | 0010 | 100001 |
| 47 | 0100 | 111011 | | 111011 | 0000 | 111011 | 0001 | 111011 | 0010 | 100011 |
| 48 | 0100 | 111010 | | 111010 | 0000 | 111010 | 0001 | 111010 | 0010 | 100010 |
| 49 | 0100 | 101000 | | 101000 | 0000 | 101000 | 0001 | 101000 | 0011 | 101000 |
| 50 | 0100 | 101001 | | 101001 | 0000 | 101001 | 0001 | 101001 | 0011 | 101001 |
| 51 | 0100 | 101011 | | 101011 | 0000 | 101011 | 0001 | 101011 | 0011 | 101011 |
| 52 | 0100 | 101010 | | 101010 | 0000 | 101010 | 0001 | 101010 | 0011 | 101010 |
| 53 | 0100 | 101100 | | 101100 | 0000 | 101100 | 0001 | 101100 | 0011 | 101100 |
| 54 | 0100 | 101101 | | 101101 | 0000 | 101101 | 0001 | 101101 | 0011 | 101101 |
| 55 | 0100 | 101111 | | 101111 | 0000 | 101111 | 0001 | 101111 | 0011 | 101111 |
| 56 | 0100 | 101110 | | 101110 | 0000 | 101110 | 0001 | 101110 | 0011 | 101110 |
| 57 | 0100 | 100100 | | 100100 | 0000 | 100100 | 0001 | 100100 | 0011 | 100100 |
| 58 | 0100 | 100101 | | 100101 | 0000 | 100101 | 0001 | 100101 | 0011 | 100101 |
| 59 | 0100 | 100111 | | 100111 | 0000 | 100111 | 0001 | 100111 | 0011 | 100111 |
| 60 | 0100 | 100110 | | 100110 | 0000 | 100110 | 0001 | 100110 | 0011 | 100110 |
| 61 | 0100 | 100000 | | 100000 | 0000 | 100000 | 0001 | 100000 | 0011 | 100000 |
| 62 | 0100 | 100001 | | 100001 | 0000 | 100001 | 0001 | 100001 | 0011 | 100001 |
| 63 | 0100 | 100011 | | 100011 | 0000 | 100011 | 0001 | 100011 | 0011 | 100011 |
| 64 | 0100 | 100010 | | 100010 | 0000 | 100010 | 0001 | 100010 | 0011 | 100010 |

Fig. 11C

MODULATION METHOD, DECODING METHOD, MODULATION DEVICE, AND DEMODULATION DEVICE

CROSS REFERENCE TO RELATED APPLICATIONS

This application is a National Stage of International Application No. PCT/JP2016/088129 filed Dec. 21, 2016.

TECHNICAL FIELD

The present disclosure relates to a modulation method, a decoding method, a modulation device, and a demodulation device.

BACKGROUND ART

With the rapid spread of Long Term Evolution (hereinafter referred to as LTE) and LTE-Advanced, it is becoming possible to provide full-scale mobile broadband services. In order to support rapidly increasing traffic in cellular networks, it is necessary to further promote ultra-high speed and large capacity properties of the fifth generation (5G) mobile communication system and to improve frequency utilization efficiency as compared with LTE. Highly efficient radio access technology is necessary in addition to heterogeneous networks which overlay small cells that efficiently accommodate non-uniform traffic in macrocells. It is also necessary to further promote ultra-high speed and large capacity properties of the backhaul between base stations and a Serving-Gateway (S-GW) in an Evolved Packet Core (EPC) network, in addition to the ultra-high speed and large capacity radio access network which achieves gigabit-class services to User Equipment (UE). A backhaul link is composed of an E1/T1 dedicated line, an optical fiber network, a microwave wireless backhaul, and the like. The wireless backhaul has an advantage of lowering the network cost compared with wired backhaul. The same can be said for the fronthaul which connects Remote Radio Equipment (RRE) to the centralized base station in a configuration in which the centralized base station performs processing of the base station composed of the RRE and processing of a physical layer and a higher-level layer of a baseband.

In a wireless backhaul using microwaves, frequency utilization efficiency has been improved by increasing a modulation level in a signal space arrangement and by using Multiple-Input Multiple-Output (MIMO) multiplexing using vertical polarization and horizontal polarization. The Rectangular or Cross QAM signal space arrangement (constellation) is implemented in a wireless backhaul using microwaves, because the Euclidean distance between signal points can be increased. When the number of signal points is $2^{2k}$, the Rectangular constellation is used. When the number of signal points is $2^{2k+1}$, the Cross constellation is used.

FIG. 1 is a diagram showing an example of a Rectangular 16 QAM constellation when k=2. In the Rectangular QAM constellation, labels of adjacent symbols, i.e., sets of information bits each representing a symbol, can achieve gray mapping, which differs by only one bit.

FIG. 2 is a diagram showing an example of a Cross 32 QAM constellation when k=2. The Cross QAM constellation is pseudo gray mapping, because full gray mapping cannot be obtained. The Rectangular or Cross QAM constellation can maximize the Euclidean distance between signal points as compared with other constellations. Therefore, these constellations are implemented in actual systems such as wireless backhauls and cellular systems.

The most significant degradation factor of characteristics in the wireless backhaul is phase noise of an RF frequency of an oscillator output of a frequency synthesizer. The Circular QAM having a concentric constellation has attracted attention in terms of its tolerance to phase noise. The Circular QAM also has an advantage of achieving a lower Peak-to-Average Power Ratio (PAPR) as compared with the Rectangular or Cross QAM. The Circular QAM is also referred to as Star QAM or Amplitude and Phase Shift Keying (APSK). The Circular QAM constellation is composed of N concentric rings. Each ring is subjected to Phase Shift Keying (PSK) processing. The Circular QAM signal space arrangement can be divided roughly into the case in which all rings have the same number of signal points and the case in which the number of signal points differs according to the ring. In the signal point arrangement in which all rings have the same number of signal points, the phases can be set commonly for all rings.

FIG. 3 is a diagram showing an example of the Circular 16 QAM constellation of 8×2 rings. As shown in FIG. 3, bits representing a symbol label can be independently mapped to bits representing amplitude or phase information. In the case of Circular 16 QAM, one of four bits of a symbol represents the amplitude information, and the other three bits represent the phase information. The Circular 16 QAM has an advantage of optimizing the ring amplitude ratio, which is a parameter that most affects Bit Error Rate (BER) characteristics, for only the bit representing the amplitude information. The Circular 16 QAM can also achieve full gray mapping, because the bits representing the amplitude and phase information can be mapped independently. However, the Circular 16 QAM has a disadvantage that the inner the ring is, the more decoding errors of the bits representing the phase information occur.

In the signal space arrangement in which the numbers of signal points on the rings differ from each other, it is possible to set the phase interval on the same ring substantially constant regardless of the ring by changing the number of signal points on the same ring. On the other hand, since each bit representing a symbol label simultaneously represents the amplitude and phase information, full gray mapping is difficult in general and instead pseudo gray mapping is used.

In the wireless backhaul using microwaves, a value higher than 0.9 is used for an overall channel coding rate. Since a coding gain is reduced due to a high channel coding rate, partial channel coding is used in which channel coding is applied to only a fixed number of bits from the least significant bit (LSB) in a symbol. In the partial channel coding, double gray mapping is used, in which gray mapping is performed independently on coded bits and uncoded bits. Since the coding rate can be reduced by channel coding a fixed number of bits from the LSB the coding gain can be increased.

FIG. 4 shows a configuration example of a transmission unit which uses the double gray mapping. When the number of information bits indicating a symbol label is m, the channel coding is performed on n bits from the LSB in ascending order. Thus, the remaining upper bits (m−n) are mapped to a symbol without being coded. When the coding rate of n bits which are subject to the channel coding is denoted by r, the overall channel coding rate R of all information bits is expressed by Equation 1.

[Formula 1]

$$R = 1 - (1-r)\frac{n}{m} \quad \text{(Equation 1)}$$

By reducing the effective coding rate r, the coding gain is increased, and thus the decoding error of the lower n bits can be reduced.

In the Circular QAM signal space arrangement in which the number of signal points in each ring is equal, each bit represents either the amplitude or phase information. Thus, for example, the Log-Likelihood Ratio (LLR) of the channel-coded amplitude bits does not contribute to the improvement of the reliability of uncoded phase bits. The same is true for the reverse combination of the amplitude bits and the uncoded phase bits. Therefore, in the Circular QAM, parallel double gray mapping is used in which double gray mapping is performed independently on the amplitude bits and phase bits.

FIG. 5 is a diagram showing a configuration example of a transmission unit which performs parallel double gray mapping of the Circular QAM. In the parallel double gray mapping, $n_a$ and $n_p$ bits are mapped to the amplitude bits and phase bits, respectively, among the lower n bits on which the channel coding is performed. Likewise, $(m_a-n_a)$ and $(m_p-n_p)$ bits are allocated to the amplitude bits and the phase bits, respectively, among (m-n) uncoded bits. As shown in FIG. 5, bits representing an amplitude and a phase are independently subject to the gray mapping separately for the coded bits and uncoded bits.

In the partial channel coding in which double gray mapping is carried out, cooperative decoding is performed.

FIG. 6 is a diagram showing a configuration example of a reception unit which performs the cooperative decoding. The reception unit shown in FIG. 6 first decodes the coded bits which have been subjected to the channel coding. The coded bits are considered to be more reliable than the uncoded bits because of the coding gain of the channel coding. The a posteriori LLR of a decoder output of the coded bits is used to reduce the number of symbol candidates for the uncoded bits. The reception unit performs double gray coding mapping in advance so that the Euclidean distance between the surviving symbol replica candidates after the reduction is increased. Thus, when the lower coded bits can be decoded without an error, the Euclidean distance between the surviving symbol replica candidate is increased, which enables the upper bits to be decoded with high reliability.

FIG. 7 shows an example of BER characteristics with respect to received Signal-to-Noise power Ratio (SNR) in an Additive White Gaussian Noise (AWGN) channel added with phase noise of a 64×16 Circular 1024 QAM having 16 signal points in each ring. FIG. 7 also shows the characteristics of Rectangular 1024 QAM for comparison. In 1024 QAM, m=10 information bits represent $2^{10}$ symbol labels. In Circular 1024 QAM, 4 bits represent the amplitude information, and 6 bits represent the phase information. The turbo coding has been used for the channel coding. The overall coding rate is R=9/10, and the actual coding rate of the channel coding bits is r=5/6. The Max-Log-MAP (Maximum a posteriori probability) decoding has been used for the decoding. The partial turbo coding has been used. The number of turbo coding bits is n=6. Specifically, the lower 2 bits of the amplitude bits and the lower 4 bits of the phase bits have been subjected to the channel coding. The phase noise has been approximated by an Autoregressive Moving Average (ARMA) model. The phase noise power level at 0 Hz is −40 dBc/Hz. As shown in FIG. 7, in the AWGN channel in which phase noise is taken into consideration, the required received SNR of the Circular 1024 QAM to satisfy BER of $10^{-5}$ is degraded by about 1 dB as compared with the Rectangular 1024 QAM. The Circular QAM has high tolerance to phase noise as compared with the Rectangular QAM. That is, in the Circular QAM, the degradation of BER when there is no phase noise is small as compared with when phase noise is taken into consideration. However, in the Circular QAM, since the Euclidean distance between signal points on the concentric inner circles is reduced, the decoding error is large. Therefore, the BER characteristics are degraded in the Circular QAM as compared with the Rectangular QAM.

CITATION LIST

Patent Literature

Patent Literature 1: International Patent Publication No. WO2013/161801

Non Patent Literature

Non Patent Literature 1: N. Kamiya and E. Sasaki, "Pilot-Symbol Assisted and Code-Aided Phase Error Estimation for High-Order QAM Transmission," IEEE Trans. on Commun., vol. 61, no. 10, pp. 4369-4380, October 201.

Non Patent Literature 2: E. Eleftheriou and S. Olcer, "Low-Density Parity-Check Codes for Digital Subscriber Lines," Proc. IEEE ICC2002, 2002.

Non Patent Literature 3: M. A. Tariq, H. Mehrpouyan, and T. Svensson, "Performance of Circular QAM Constellations with Time Varying Phase Noise, Proc. IEEE PIMRC2012.

Non Patent Literature 4: Y. Li, S. Xu, and H. Yang, "Design of Circular Signal Constellations in the Presence of Phase Noise," Proc. WICOM2008.

SUMMARY OF INVENTION

Technical Problem

The Rectangular QAM or Cross QAM constellation is employed in the wireless backhaul. The most significant degradation factor of BER is phase noise also in the wireless backhaul. In the Circular QAM constellation, the level of the BER degradation due to the phase noise is small as compared with the Rectangular QAM and Cross QAM, given that the number of the signal points are the same. On the other hand, the Circular QAM constellation has a problem that the BER is degraded as compared with the Rectangular QAM and Cross QAM, because of the short Euclidean distance between signal points particularly on an inner ring.

An object of the present disclosure is to provide a modulation method, a decoding method, a modulation device, and a demodulation device that solve the above-described problem.

Solution to Problem

A modulation method according to the present disclosure for mapping information bits to signal points on a plurality of concentric rings, the modification method includes:

when a signal space arrangement in which the number of signal points on all of the plurality of rings is the same is used as a basis, reducing the number of signal points on an innermost ring or a plurality of rings from inner to outer rings from among the plurality of rings;

generating a new ring outside the signal space arrangement used as the basis; and arranging, on the generated ring, signal points which achieve the same frequency utilization efficiency as that of the signal space arrangement used as the basis.

Further, a decoding method according to the present disclosure includes:

for a signal modulated using a method for mapping information bits to signal points on a plurality of concentric rings, performing error correction decoding on $(n_a-n_p)$ bits, which are a difference between lower $n_a$ bits of amplitude bits of the signal and $n_p$ bits of phase bits of the signal;

reducing symbol replica candidates based on a posteriori log-likelihood ratio of the information bits and parity check bits output from an error correction decoder; and obtaining upper uncoded $(m_a-n_a)$ bits of the amplitude bits and upper uncoded $(m_p-n_p)$ bits of the phase bits for the reduced symbol replica candidates.

Further, a modulation device according to the present disclosure includes a mapping circuit configured to map information bits to signal points on a plurality of concentric rings, when a signal space arrangement in which the number of signal points on all of the plurality of rings is the same is used as a basis, reduce the number of signal points on an innermost ring or a plurality of rings from inner to outer rings from among the plurality of rings, generate a new ring outside the signal space arrangement used as the basis, and arrange, on the generated ring, signal points which achieve the same frequency utilization efficiency as that of the signal space arrangement used as the basis.

A demodulation device according to the present disclosure includes a decoding circuit configured to, for a signal modulated using a method for mapping information bits to signal points on a plurality of concentric rings, perform error correction decoding on lower $n_a$ bits of amplitude bits of the signal and lower $n_p$ bits of phase bits of the signal using an error correction decoder, reduce symbol replica candidates based on a posteriori log-likelihood ratio of the information bits and parity check bits output from the error correction decoder, and obtain upper uncoded $(m_a-n_a)$ bits of the amplitude bits and upper uncoded $(m_p-n_p)$ bits of the phase bits for the reduced symbol replica candidates.

Advantageous Effects of Invention

As described above, in the present disclosure, BER can be improved as compared with Rectangular QAM and Cross QAM.

BRIEF DESCRIPTION OF DRAWINGS

FIG. 10A is a diagram showing an example of a relationship between respective signal points before bit mapping replacement and information bits when the modulation method according to the present disclosure is used;

FIG. 10B is a diagram showing an example of the relationship between respective signal points before bit mapping replacement and information bits when the modulation method according to the present disclosure is used;

FIG. 10C is a diagram showing an example of the relationship between respective signal points before bit mapping replacement and information bits when the modulation method according to the present disclosure is used;

FIG. 11A is a diagram showing an example of the relationship between respective signal points after bit mapping replacement and information bits when the modulation method according to the present disclosure is used;

FIG. 11B is a diagram showing an example of the relationship between respective signal points after bit mapping replacement and information bits when the modulation method according to the present disclosure is used;

FIG. 11C is a diagram showing an example of the relationship between respective signal points after bit mapping replacement and information bits when the modulation method according to the present disclosure is used;

DESCRIPTION OF EMBODIMENTS

Figure 1:
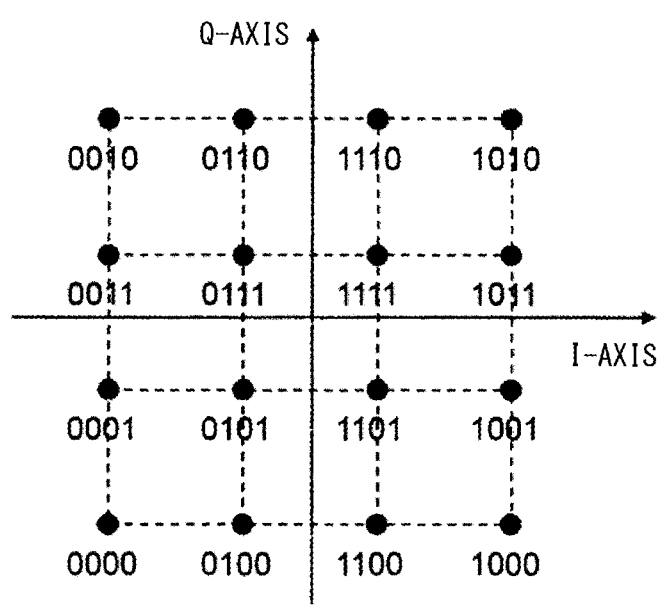
FIG. 1 is a diagram showing an example of a Rectangular 16 QAM constellation when k=2.
Figure 2:
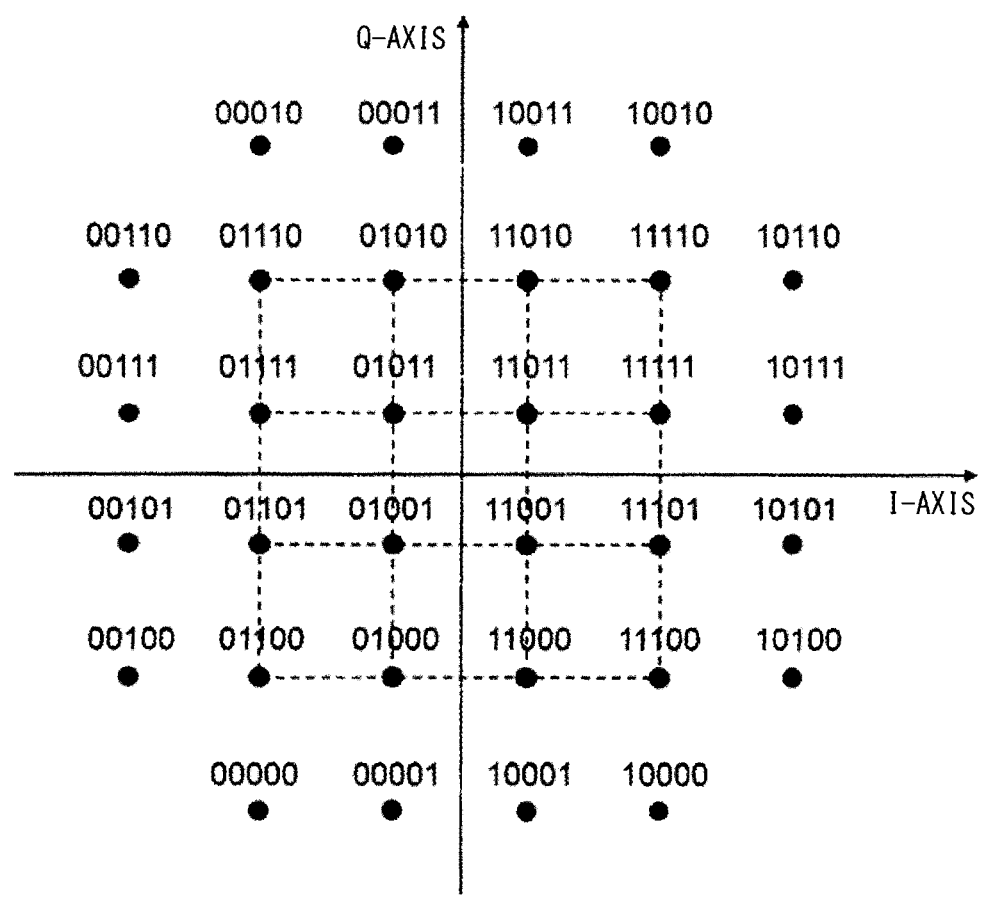
FIG. 2 is a diagram showing an example of a Cross 32 QAM constellation when k=2.
Figure 3:
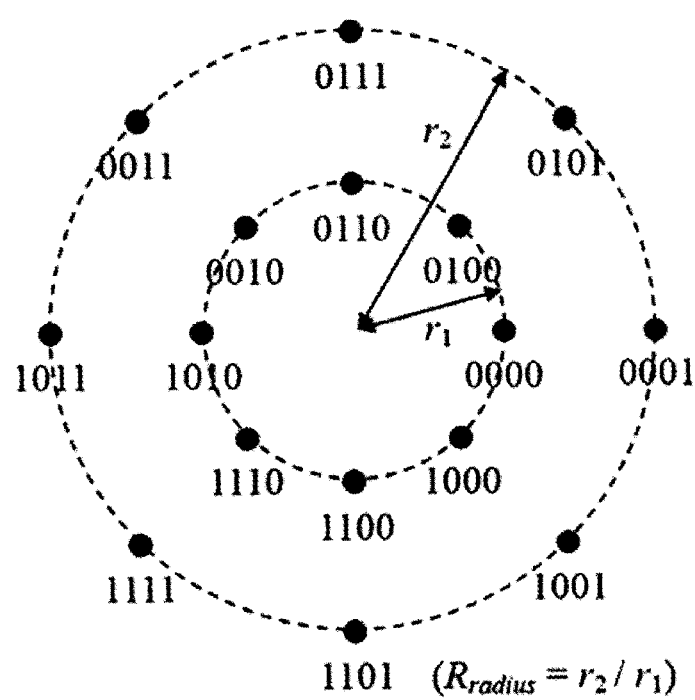
FIG. 3 is a diagram showing an example of a circular 16 QAM constellation of 8×2 rings.
Figure 4:
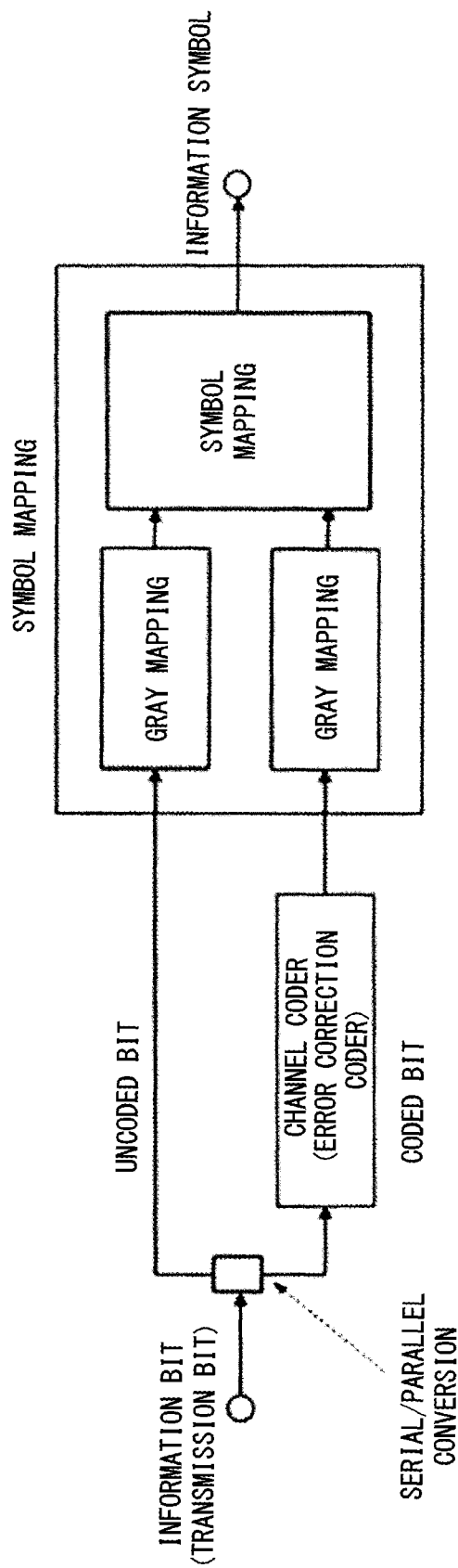
FIG. 4 shows a configuration example of a transmission unit which uses double gray mapping.
Figure 5:
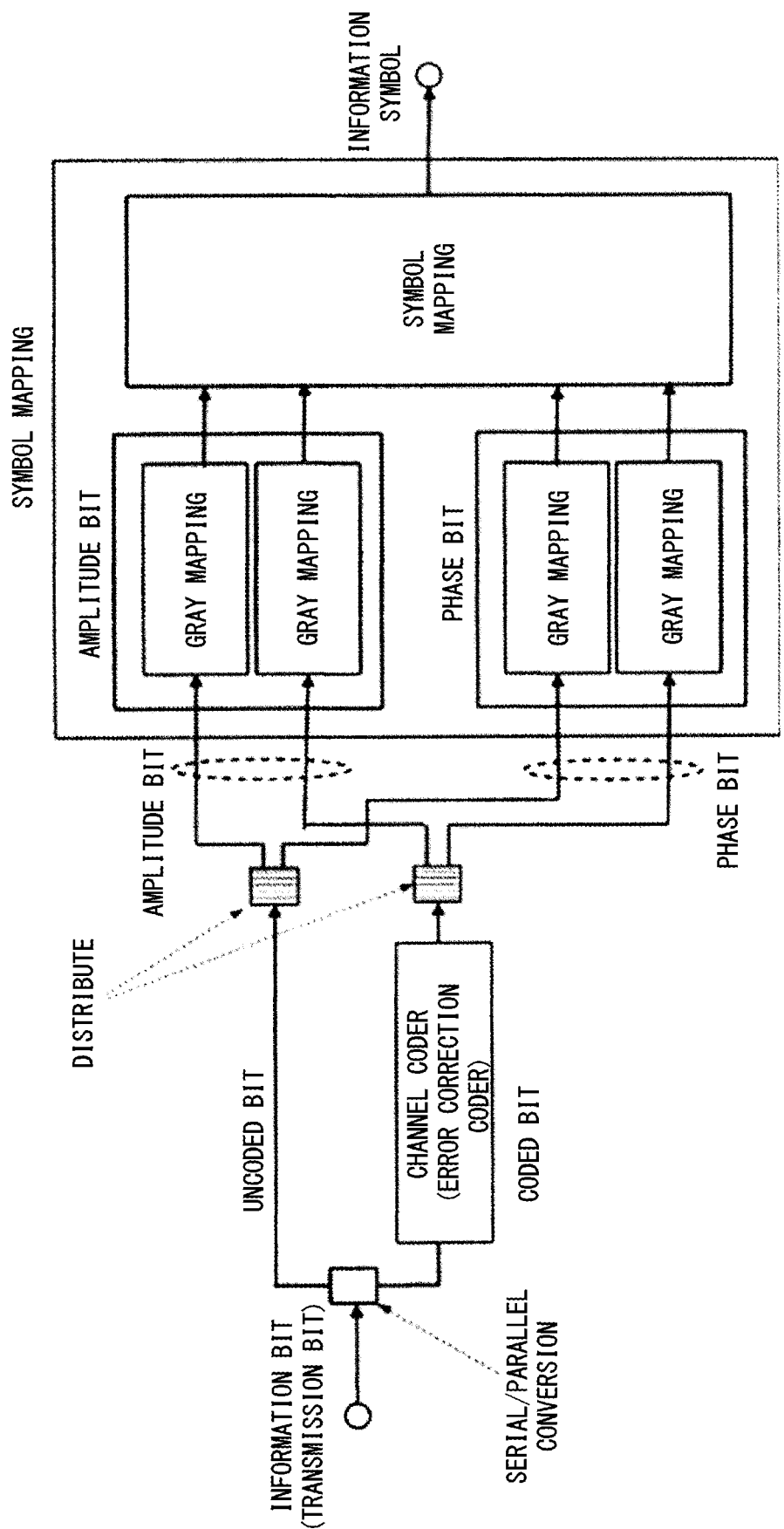
FIG. 5 is a diagram showing a configuration example of a transmission unit which performs parallel double gray mapping in Circular QAM.
Figure 6:
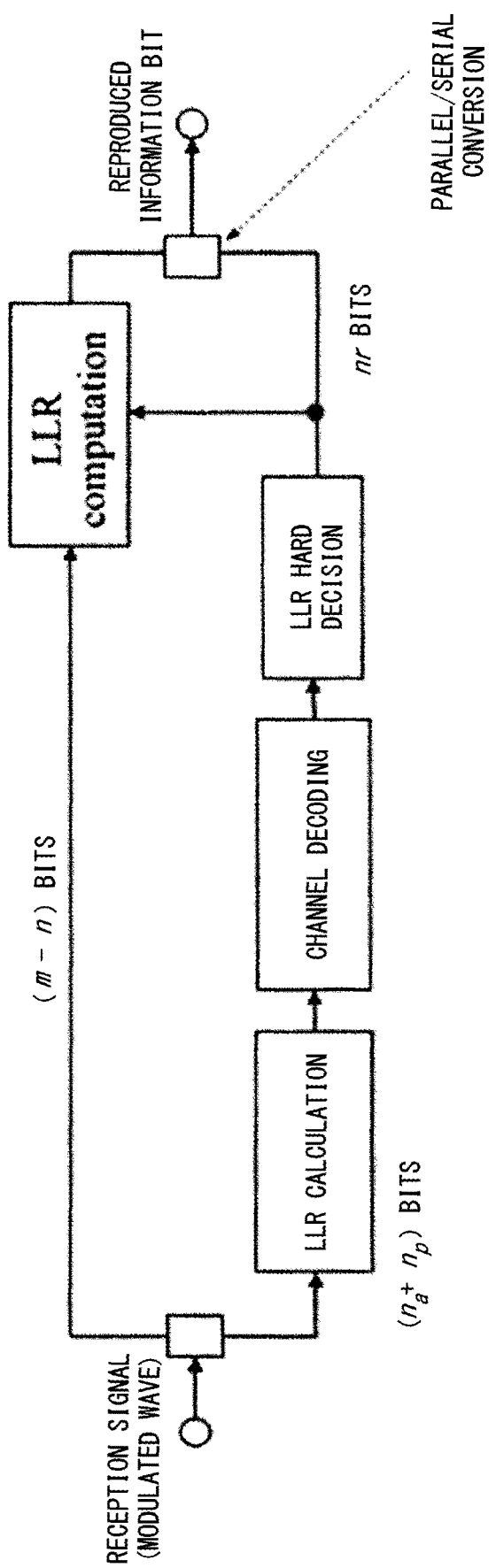
FIG. 6 is a diagram showing a configuration example of a reception unit which performs cooperative decoding.
Figure 7:
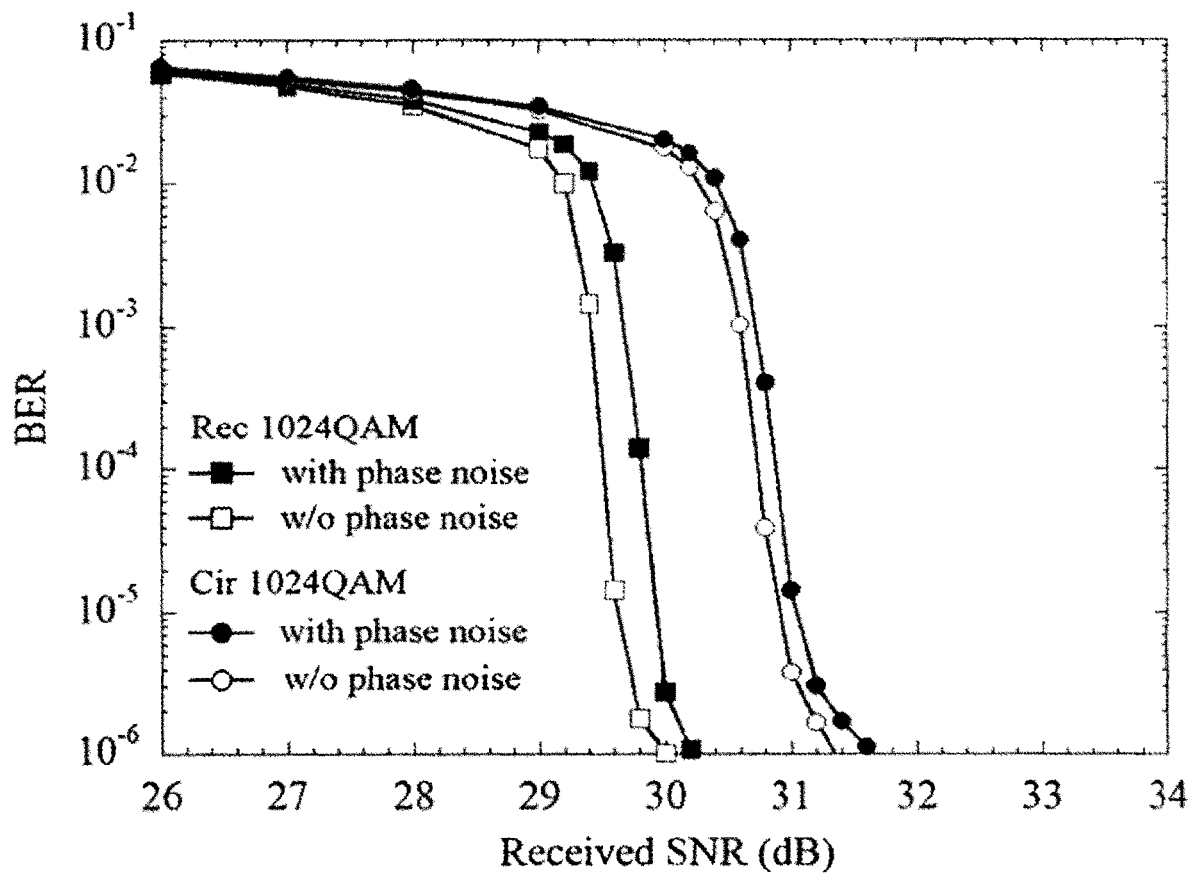
FIG. 7 is a diagram showing an example of BER characteristics with respect to a received signal power-to-noise power ratio in an additive white Gaussian noise channel added with phase noise of 64×16 Circular 1024 QAM having 16 signal points in each ring.

The present disclosure achieves a modulation method in which information bits are mapped to respective symbols of concentric Circular QAM, namely, signal points. The modulation method according to the present disclosure has the following three features.

(1) A bit mapping method for mapping information bits to symbols (signal points) of the Circular QAM
(2) A determination method for determining a ring amplitude of the Circular QAM
(3) A channel coding (error correction coding) method for channel cording bits representing each symbol (signal point) label Hereinafter, each of the above features are described.

1) The bit mapping method for mapping information bits to symbols (signal points) of the Circular QAM —Step 1

Firstly, the modulation method according to the present disclosure creates a Circular QAM constellation having the same number of signal points on all rings. When the number of bits representing phase information is $m_p$, the number of signal points on each ring is obtained from Formula 2.

$$2^{m_p} \quad \text{[Formula 2]}$$

Further, when the number of bits representing the amplitude information is $m_a$, the number of rings is obtained from Formula 3.

$$2^{m_a} \quad \text{[Formula 3]}$$

Here, the number of rings and the number of signal points on the rings (i.e., the phase angle), which are $m_a$ and $m_p$, respectively, are suboptimized. Specifically, the number of rings and the number of signal points in each ring are determined so that the Bit Error Rate (BER) characteristics of an AWGN channel added with phase noise becomes the most favorable. Such a constellation having the same number of signal points on all rings is defined as an original constellation.

—Step 2

The number of signal points on the inner ring is reduced from that in Step 1. The reduced number of signal points is set so that it becomes a power of two.

$$2^{m_a} \quad \text{[Formula 4]}$$

From among the rings, the number of which is obtained from Formula 4, the number of signal points on $2^h$ rings is reduced to the number of rings obtained from Formula 5 in a direction extending from the innermost ring to the outside.

$$2^a == 2^{m_p - h} \quad \text{[Formula 5]}$$

In this case, the total number of signal points on the $2^h$ rings having the signal points, the number of which is obtained from Formula 6, on each ring is adjusted so that it becomes the number obtained from Formula 7.

$$2^{m_p - h} \quad \text{[Formula 6]}$$

$$\lambda \times 2^{m_p} \quad \text{[Formula 7]}$$

In this formula, $\lambda$ is an integer of 1 or more.

The mapping of the symbols to the information bits is easy when the value of $\lambda$ is limited to an integer of 1 or more. However, commonly the value of $\lambda$ can be extended to a real number obtained from Formula 8 ($\beta$ and $\gamma$ represent integer values).

[Formula 8]

$$\lambda = \frac{\beta}{\gamma}$$

Further, the value of h can be easily extended to a plurality of values. That is, a set of rings having the number of signal points fewer than the number of signal points on each ring in the original constellation can be easily extended to a plurality of sets of signal points.

—Step 3

In Step 2, the number of signal points per ring has been reduced for the inner rings as compared with that of the original constellation. Thus, in order to achieve the same modulation efficiency (frequency utilization efficiency) (i.e., the same number of signal points) as that of the original constellation, the signal points corresponding to the reduced number of signal points are mapped to a ring created outside of the original constellation. In this case, there are the following two methods (A) and (B) as a method for setting the number of signal points on the added ring.

(A) A method for setting the number of signal points on the added ring so that it becomes the same as the number of signal points on each ring of the original constellation (B) A method for setting the number of signal points on the added ring so that it becomes different from the number of signal points on the rings of the original constellation In the method (B), specifically, since the ring to be added is added outside the ring to which the signal points, the number of which is the same as that of the original constellation, are mapped, more signal points are mapped to the ring to be added than the signal points on each ring of the original constellation.

—Step 4

The bit mapping of the signal points on the ring newly added outside the basic signal space arrangement in Step 3 is replaced. There are the following two methods (C) and (D) as the replacement methods (correction methods).

(C) A method for replacing the bit mapping of signal points on the newly-added ring so that the Euclidean distance of phase bits between the signal points on the same phase of different rings is reduced.

(D) A method for replacing the bit mapping of signal points on the newly-added ring so that the distance between the signal points having the same lower coded bits in the bits representing the phase information is increased.

2) A determination method for determining a ring amplitude of the Circular QAM

The present disclosure discloses the following two methods of setting the ring amplitude of a plurality of rings of the Circular QAM.

A method for making all ring amplitude ratios the same in the above-described method 1) of mapping the information bits to the signal points according to the present disclosure.

A method for grouping the rings into a plurality of sets of rings in which the signal points on the rings belonging to the same set are the same as each other, setting ring amplitude ratios to be the same for the rings belonging to the same set, and setting the ring amplitude ratios between the set of rings having different number of signal points and the ring amplitude ratios of the rings belonging to the set of rings having a different number of signal points to be different from each other in the above-described method 1) of mapping the information bits to the signal points according to the present disclosure.

3) A channel coding (error correction coding) method for bits representing each symbol (signal point) label In the present disclosure, in the above-described method 1) of mapping the information bits to the signal points according to the present disclosure, among $m_a$ bits representing the amplitude information and the $m_p$ bits representing the phase information, $(n_a + n_p)$ bits, which is a sum of the lower $n_a$ bits of the amplitude bits and $n_p$ bits of the phase bits, are subjected to the channel coding regardless of the number of signal points on each ring. The channel coding is not performed on the remaining $(m_a-n_a)+(m_p-n_p)$ bits. The amplitude bits and the phase bits are independently subjected to the double gray mapping. That is, for the amplitude bits, the double gray mapping is performed on the $n_a$ coded bits and the $(m_a-n_a)$ uncoded bits. For the phase bits, the double gray mapping is performed on the $n_p$ coded bits and the $(m_p-n_p)$ uncoded bits.

A receiver first performs error correction decoding on the $(n_a-n_p)$ lower bits of the amplitude bits and the phase bits. The symbol replica candidates are reduced from the bits, which are the information bits of the error correction decoder output and the a posteriori LLR of the parity check bits which have been subjected to a hard decision. For the reduced symbol replica candidates, the upper uncoded bits $(m_a-n_a)$ of the amplitude bits and the upper uncoded bits $(m_p-n_p)$ of the phase bits are obtained.

Hereinafter, an embodiment according to the present disclosure is described in detail with reference to the drawings. Firstly, steps of the modulation method according to the present disclosure is described.

(Step 1)

In the present disclosure, firstly a constellation in which all concentric rings have the same number of signal points is created. The number of information bits representing the symbol label is denoted by m, the number of bits representing the amplitude information among the m bits is denoted by $m_a$, and the number of bits representing the phase information among the m bits is denoted by $m_p$. Here, $m=m_a+m_p$. This constellation is defined as the original constellation. When the number of rings in this case is $N_{Orig}$, Formula 9 holds.

$$N_{Orig}=2^{m_a} \qquad \text{[Formula 9]}$$

(Step 2)

From the state in which the number of rings is the one obtained from Formula 10, the number of signal points on the $2^h$ rings is reduced to the number of signal points obtained from Formula 11 in a direction extending from the innermost ring toward the outside.

$$2^{m_a} \qquad \text{[Formula 10]}$$

$$2^a=2^{m_p-h} \qquad \text{[Formula 11]}$$

(Step 3)

The channel coding is applied to the lower $n_a$ bits in ascending order from the LSB of the $m_a$ amplitude bits. The remaining $(m_a-n_a)$ bits are uncoded bits. In the innermost $2^h$ rings, the upper $(m_a-h)$ bits of the amplitude bits are the same bits. However, Formula 12 holds here.

$$n_a \leq h \qquad \text{[Formula 12]}$$

(Step 4)

The double gray mapping is performed independently on the $n_a$ coded bits and the $(m_a-n_a)$ uncoded bits.

(Step 5)

The same bit mapping as that of the original constellation is applied to the $(2^h+1)$-th to the $N_{Orig}$-th rings sequentially from the inside. That is, the phase information of $m_p$ bits of each ring is applied to the signal points, the number of which is obtained from Formula 13, from the $(2^h+1)$-th to the $N_{Orig}$-th rings.

$$2^{m_p} \qquad \text{[Formula 13]}$$

(Step 6)

Among the amplitude information bits of $m_a$ bits, the channel coding is applied to the lower $n_a$ bits, and the remaining $(m_a-n_a)$ bits are uncoded. Then, the double gray mapping is performed independently on the $n_a$ coded bits and the $(m_a-n_a)$ uncoded bits.

(Step 7)

In the present disclosure, as for the innermost $2^h$ rings, the signal points are fewer than those of the original constellation by the number obtained from Formula 14 per ring.

$$2^{m_p-h} \times (2^h-1) \qquad \text{[Formula 14]}$$

Thus, in $2^h$ rings, the signal points are fewer by the number obtained from Formula 15.

$$2^{m_p-h} \times (2^x-1) \times 2^x \qquad \text{[Formula 15]}$$

The signal points, the number of which is obtained from Formula 16, need to be allocated to the rings other than the $2^h$ rings.

$$2^{m_p-x} \times (2^x-1) \times 2^x \qquad \text{[Formula 16]}$$

In the method according to the present disclosure, $(2^h-1)$ rings are newly generated outside of the $N_{Orig}$ rings of the original constellation. Then the signal points, the number of which is obtained from Formula 17, are allocated to the generated $(2^h-1)$ rings.

$$2^{m_p-h} \times (2^h-1) \times 2^h \qquad \text{[Formula 17]}$$

The signal points, the number of which is obtained from Formula 18, are allocated to each ring.

$$2^{m_p-h} \times 2^h = 2^{m_p} \qquad \text{[Formula 18]}$$

When the number of rings in the method according to the present disclosure is $N_{New}$, $N_{New}=N_{Orig}+(2^h-1)$ holds.

Sets of $m_p$ bits, the number of which is obtained from Formula 19, are allocated in order. The number of sets of $m_p$ bits allocated to each ring is obtained from Formula 20.

$$2^{m_p-h} \times (2^h-1) \times 2^h \qquad \text{[Formula 19]}$$

$$2^{m_p} \qquad \text{[Formula 20]}$$

(Step 8)

Also for the $(N_{Orig}+1)$-th ring to $N_{New}$-th ring, among the amplitude information bits of $m_a$ bits, the channel coding is applied to the lower $n_a$ bits, and the remaining $(m_a-n_a)$ bits are uncoded. Then, the double gray mapping is performed independently on the $n_a$ coded bits and the $(m_a-n_a)$ uncoded bits.

Furthermore, by extending the above-described process of Step 2 and setting a plurality of values of h, it is possible to create a plurality of sets of rings having the numbers of signal points different from each other on the rings. The values of the plurality of h shall be $h_1, h_2, \ldots$. Here, Formula 21 holds.

$$h_1 \leq h_2 \leq \ldots \qquad \text{[Formula 21]}$$

In this case, the number of amplitude bits $n_a$ to be subject to the channel coding is set so that Formula 22 is satisfied.

$$n_a \leq h_1 \qquad \text{[Formula 22]}$$

Moreover, $(2^h-1)$ rings having signal points, the number of which is equal to the number of signal points on each ring of the original constellation and is obtained from Formula 23, are created outside $N_{Orig}$ rings of the original constellation of the above-described Step 7.

$$2^{m_p} \qquad \text{[Formula 23]}$$

Here, the signal points, the number of which is larger than the number obtained from Formula 24, are arranged on the ring created outside the $N_{Orig}$ rings of the original constellation.

$$2^{m_p} \qquad \text{[Formula 24]}$$

By doing so, the total number of rings $N_{New}$ according to the present disclosure can be reduced from $N_{New}=N_{Orig}+(2^h-1)$. In this case, it is not necessary to arrange the signal points having the same number of the signal points on each ring added to the original constellation and instead the number of signal points may differ from ring to ring. Commonly, it is possible to arrange a large number of signal points on the outer rings, because the greater the ring amplitude is, the greater the Euclidean distance between the signal points on the same ring becomes.

Figure 8:
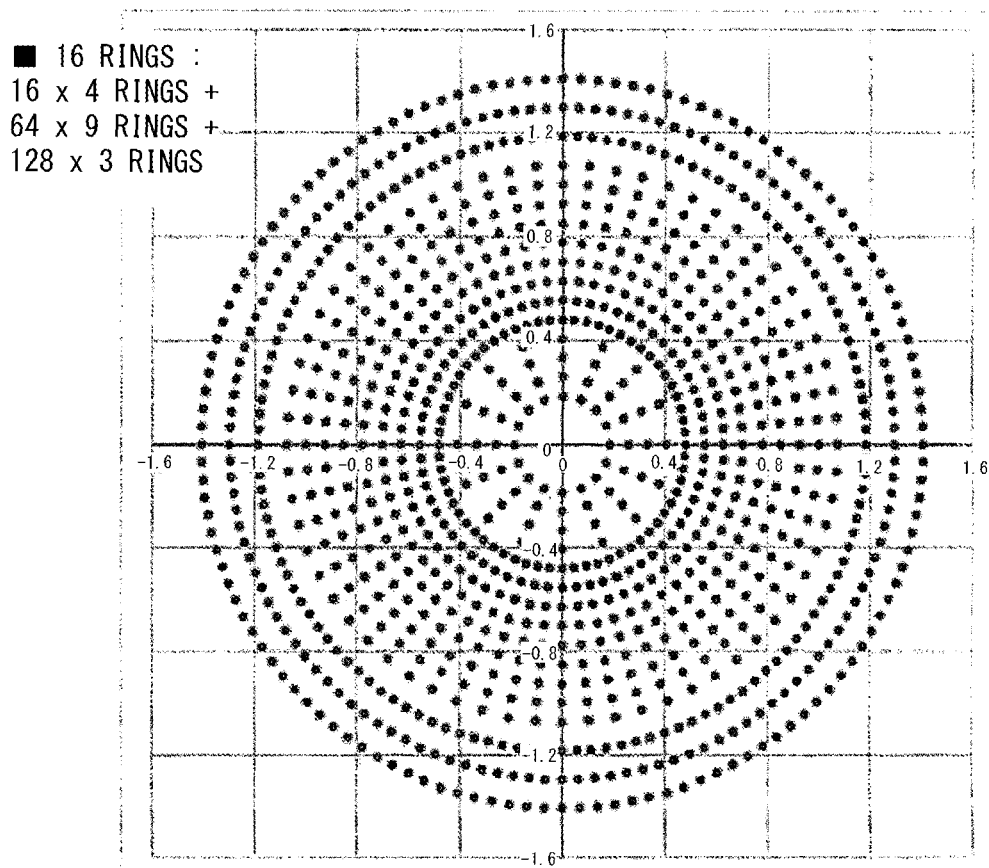
FIG. 8 is a diagram showing an example of a Circular 1024 QAM constellation when a modulation method according to the present disclosure is used.

FIG. 8 is a diagram showing an example of a Circular 1024 QAM constellation when the modulation method according to the present disclosure is used. In the example of the Circular QAM shown in FIG. 8, the constellation is composed of 16 rings in total, which are: 16 signal points×4 rings+64 signal points×9 rings+128 signals×3 rings.

On the other hand, it is desirable to reduce the number of signal points on the same ring to increase a phase angle between the signal points in order to improve the tolerance to phase noise. When the number of signal points on each ring is reduced, it is necessary to increase the number of amplitude bits to increase the number of rings.

Figure 9:
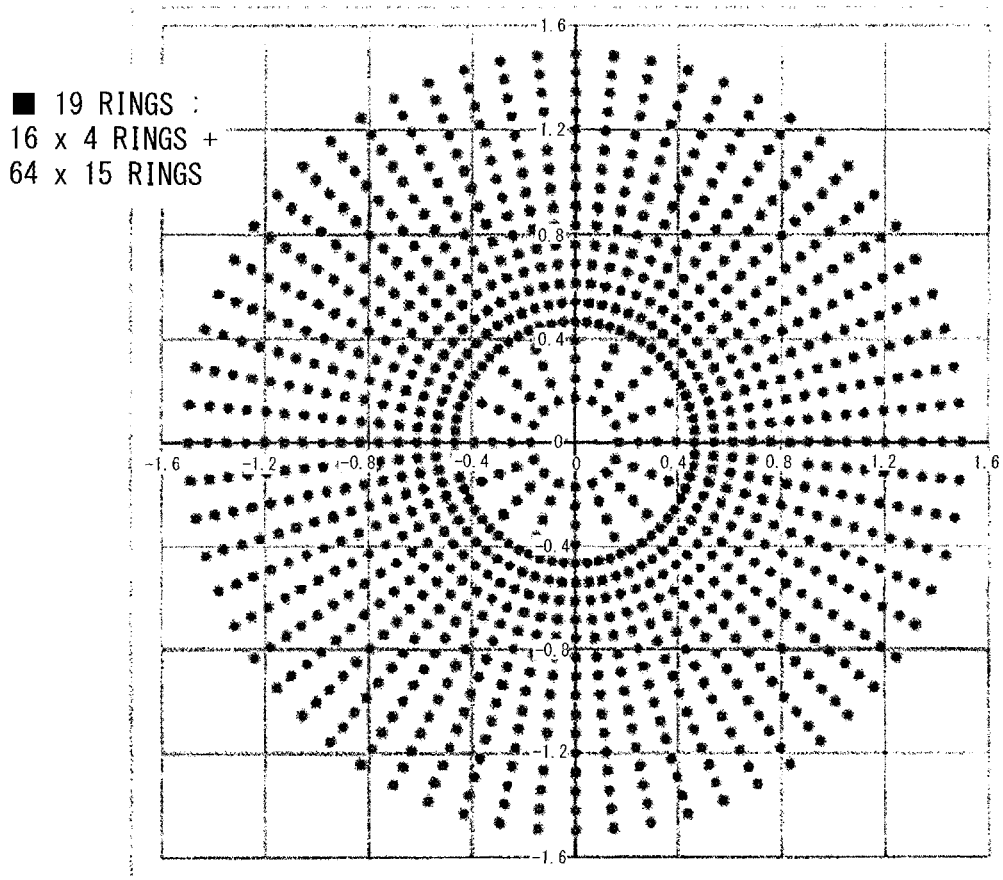
FIG. 9 is a diagram showing an example of a Circular 1024 QAM constellation when the modulation method according to the present disclosure is used.

FIG. 9 is a diagram showing an example of a Circular 1024 QAM constellation when the modulation method according to the present disclosure is used. In the example of the Circular QAM shown in FIG. 9, the constellation is composed of 19 rings in total, which are: 16 signal points×4 rings+64 signal points×15 rings. When the average signal power is fixed, the ring amplitude of the inner ring is reduced as the number of rings increases, and thus the Euclidean distance between the signal points on the ring is reduced. Therefore, it is necessary to optimize the number of signal points on the ring and the number of rings using actual error rate characteristics.

An example of a Circular 1024 QAM having 64×16 rings using the modulation method according to the present disclosure is described below.

FIGS. 10A to 10C are diagrams showing an example of the relationship between the respective signal points before bit mapping replacement and the information bits when the modulation method according to the present disclosure is used. FIGS. 11A to 11C are diagrams showing an example of the relationship between the respective signal points and the information bits after bit mapping replacement when the modulation method according to the present disclosure is used.

A circular 1024 QAM having 64×16 rings of $m_a=4$ bits and $m_p=6$ bits is defined as an initial state constellation. In this example, $n_a=h$ holds.

Figure 12:
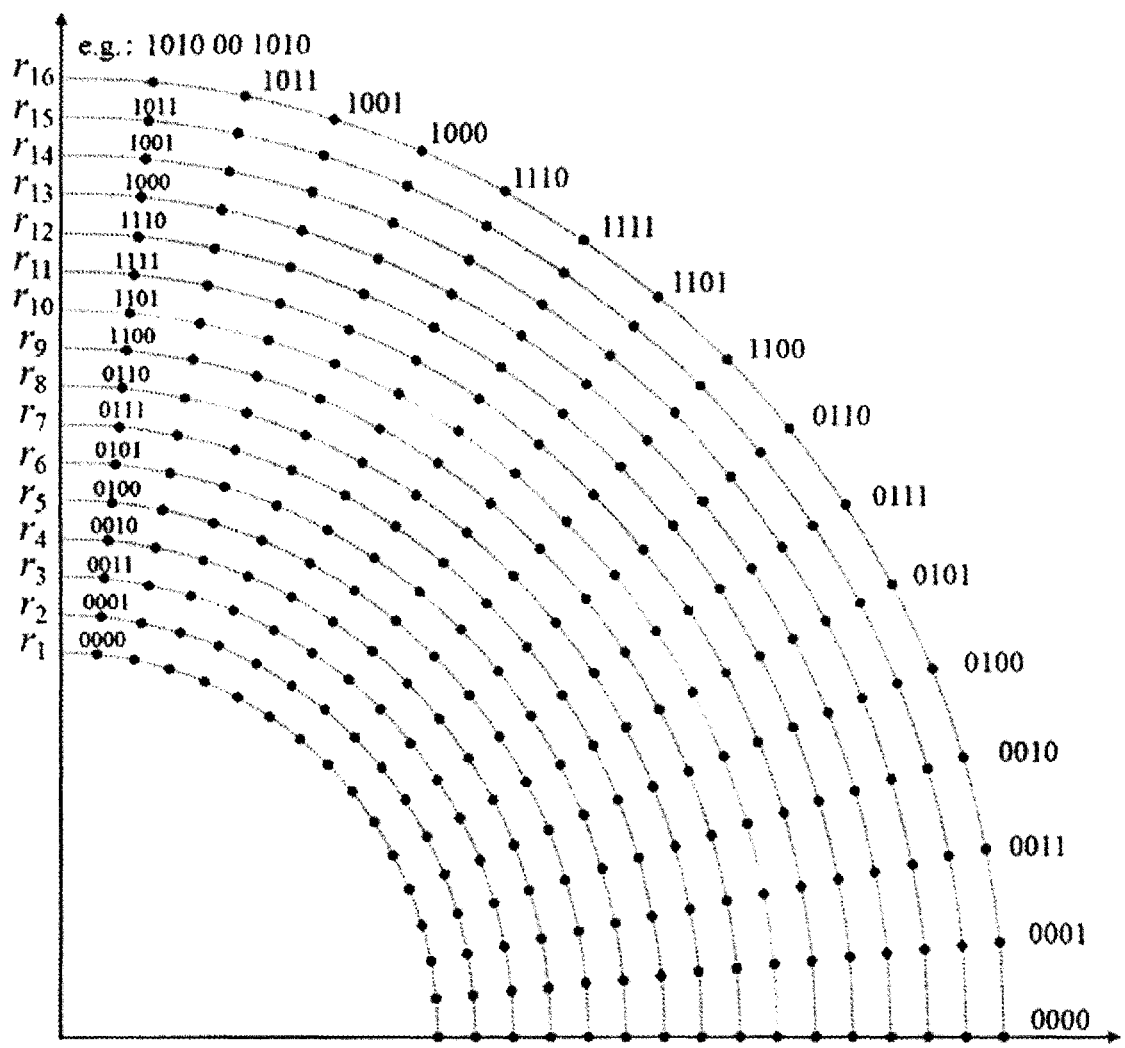
FIG. 12 is a diagram showing an example of an initial state constellation in a first quadrant of the Circular 1024 QAM having 64×16 rings as a specific example of the modulation method according to the present disclosure.

FIG. 12 is a diagram showing an example of the initial state constellation in a first quadrant of the circular 1024 QAM having 64×16 rings as a specific example of the modulation method according to the present disclosure. As shown in FIG. 12, 64 signal points are arranged in equal phase on each of the 16 rings. The amplitude bits of $m_a=4$ bits are allocated to the upper bits of the 10-bit symbol label, and the phase bits of $m_p=6$ bits are allocated to the lower bits of the 10-bit symbol label. Further, the upper two bits of the phase bits of $m_p=6$ bits represent a quadrant.

The number of signal points in the inner $2^h$ rings=4 rings (i.e., h=2) is obtained from Formula 25.

$$2^a=2^{m_p-k}=2^4=16 \quad \text{[Formula 25]}$$

Figure 13:
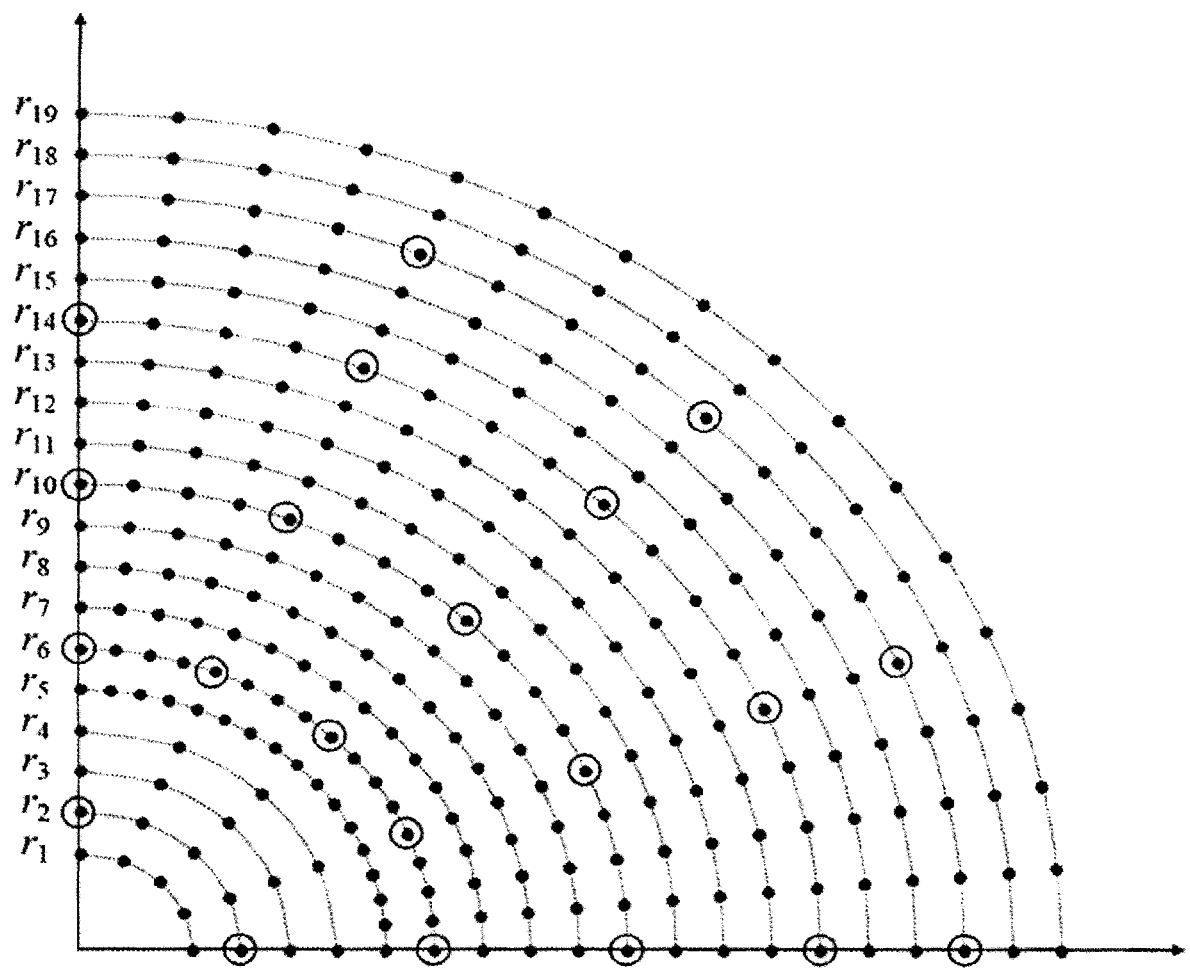
FIG. 13 is a diagram showing an example of a Circular 1024 QAM constellation (signal point arrangement in the first quadrant) according to the present disclosure.

FIG. 13 is a diagram showing an example of the Circular 1024 QAM constellation (a signal point arrangement in a first quadrant) according to the present disclosure. As shown in FIG. 13, on the 4 innermost rings, 16 signal points are allocated to each ring. On each ring, 16 signal points are allocated at the same phase intervals.

The lower h=2 bits of $m_a=4$ bits are subject to the gray mapping. The upper $(m_a-h)=2$ bits of the amplitude bits are the same in the innermost $2^h=4$ rings. As shown in FIGS. 10 and 11, the amplitude bits of the innermost four rings are 0000, 0001, 0011, 0010 in order from the inside, the lower bits are gray coded, and the upper two bits are the same. Similarly to the original constellation, the signal points, which represent the phase information of mp=6 bits and the number of which is obtained from Formula 26, are allocated to the $(2^h+1)$=5th to the $N_{Orig}$=16-th rings in order from the inside.

$$2^{m_p}=64 \quad \text{[Formula 26]}$$

In the present disclosure, as for the innermost $2^X=4$ rings, the signal points are fewer than those of the original constellation by the number obtained from Formula 27 per ring.

$$2^{m_p-h} \times (2^h-1)=2^4 \times (2^2-1)=48 \quad \text{[Formula 27]}$$

Thus, in $2^h=4$ rings, the signal points are fewer by the number obtained from Formula 28.

$$2^{m_p-h} \times (2^h-1) \times 2^h=48 \times 4=192$$

The signal points, the number of which is obtained from Formula 29, need to be allocated to the rings other than the $2^h=4$ rings.

$$2^{m_p-h} \times (2^h-1) \times 2^h=192 \quad \text{[Formula 29]}$$

In the method according to the present disclosure, $(2^h-1)=3$ rings are newly generated outside of the $N_{Orig}=16$ rings of the original constellation. Then the signal points, the number of which is obtained from Formula 30, are allocated to the generated $(2^h-1)=3$ rings.

$$2^{m_p-h} \times (2^h-1) \times 2^h=192 \quad \text{[Formula 30]}$$

The signal points, the number of which is obtained from Formula 31, are allocated to each ring.

$$2^{m_p-h} \times 2^h=2^{m_p}=64 \quad \text{[Formula 31]}$$

When the number of rings in the method according to the present disclosure is $N_{New}$, $N_{New}=N_{Orig}+(2^h-1)=19$ holds. As shown in FIGS. 10B, 10C, 11B, and 11C, sets of $m_p$ bits, the number of which is obtained from Formula 32, are allocated in order. The number of sets of $m_p$ bits allocated to each ring is obtained from Formula 33.

$$2^{m_p-h} \times (2^h-1) \times 2^h \quad \text{[Formula 32]}$$

$$2^{m_p}=64 \quad \text{[Formula 33]}$$

FIGS. 10A and 11A show the same contents. Specifically, the bit mappings of the signal points of the inner four rings in which the signal points on the rings are reduced are identical to each other. The bit mappings of the signal points on the three newly-added rings shown in FIG. 10 differ from the ones shown in FIG. 11 with respect to the original signal space arrangement. The bit mappings shown in FIGS. 10B and 10C are examples in which bit mapping is applied to the signal points on the three rings in the order of the upper 4 bits of the amplitude bits and in the order of the lower 6 bits of the phase bits. Here, the lower 2 coded bits of the upper 4 bits of the amplitude bits are gray-coded. With this bit mapping method, as shown in FIGS. 10B and 10C, in the added three rings, the phase bits at the same phase position, i.e., phase bits between the signal points having the same bit index at the leftmost column differ from one another. Therefore, when a decision error occurs between two symbols of the same phase, a decoding error of the phase bits occurs like together with a decoding error of the amplitude bits. The bit mappings shown in FIGS. 10B and 10C are obtained by a method in which the bit mapping is improved so that the influence of a decision error between two symbols of the same phase is reduced. The example shown in FIGS. 10B and 10C shows a method in which bit mapping is applied so that the phase bits between two symbols of the same phase between adjacent rings of the added three rings become the same (however, the phase bits between all two symbols of the same phase are not the same). In the bit mapping shown in FIG. 11, the influence of decision errors between two symbols of the same phase can be reduced as compared with the bit mappings shown in FIG. 10, thereby achieving a satisfactory error rate. As a method for replacing the bit mappings of the signal points of the newly-added rings, there is a method of bit mapping in such a way that the Euclidean distance between the signal points at which the channel coded bits of the lower bits of the amplitude bits and the phase bits is increased.

The Circular QAM according to the present disclosure has a concentric constellation like the original constellation. The parameter that greatly affects the bit error rate of the Circular QAM is the ring amplitude. The following two methods for determining the ring amplitude are disclosed in the present disclosure.

A first method for determining the ring amplitude is as follows. The first method for determining the ring amplitude ratio is a method for setting the ring amplitude ratio to a fixed value regardless of the number of signal points on a plurality of rings.

(1) The innermost ring $r_1$ is set to a fixed value $\delta$.

(2) $r_k = r_2, \ldots, r_M$ of the second and subsequent innermost rings are obtained using Equation 2.

$$r_{k+1} = r_k + \Delta \times r_1 \qquad \text{(Equation 2)}$$

Here, $\Delta$ is the ring amplitude ratio.

(3) The amplitude value of each ring is normalized as shown in Equation 3 with the power of all signal points so that the average power becomes a preset value.

[Formula 34]

$$\hat{r}_k = r_k / \sqrt{\frac{1}{2^m} \sum_i s_i^2} \qquad \text{(Equation 3)}$$

Here, $\delta$ and $\Delta$ values are determined using a computer simulation so that the best BER is achieved.

The second method for determining the ring amplitude is a method for dividing all the rings into blocks of a plurality of rings having the same number of signal points on the rings in the Circular QAM constellation according to the present disclosure. The index of the block is denoted by u. At this time, Formula 35 holds.

Further, the index of the ring of each block is denoted by v.

$$1 \leq u \leq U \qquad \text{[Formula 35]}$$

At this time, Formula 36 holds.

$$1 \leq v \leq V^{(u)} \qquad \text{[Formula 36]}$$

The ring amplitude of ring v of block u is denoted by $r_{u,v}$.

(1) The innermost ring $r_{1,1}$ is set to a fixed value $\delta$.

(2) The ring amplitude of the ring of a block 1 is obtained using Equation 4.

[Formula 37]

$$r_{1,v+1} = r_{1,v} + \Delta_1 \times r_{1,1} \qquad \text{(Equation 4)}$$

(3) The ring amplitude of the innermost ring of a block 2 is obtained from the ring amplitude of the outermost ring of the block 1 using Equation 5.

[Formula 38]

$$r_{2,1} = r_{1,V(1)} + \Delta_{2/1} \times r_{1,1} \qquad \text{(Equation 5)}$$

(4) Commonly, the ring amplitudes of the rings in the same block are obtained using Equation 6.

[Formula 39]

$$r_{u,v+1} = r_{u,v} + \Delta_u \times r_{u,1} \qquad \text{(Equation 6)}$$

(5) The ring amplitude of the innermost ring of a block (u+1) is obtained from the ring amplitude of the outermost ring of a block u using Equation 7.

[Formula 40]

$$r_{u+1,1} = r_{u,V^{(u)}} + \Delta_{u+1/u} \times r_{u,1} \qquad \text{(Equation 7)}$$

(6) The amplitude value of each ring is normalized as shown in Equation 8 with the power of all signal points so that the average power becomes a preset value.

[Formula 41]

$$\hat{r}_{u,v} = r_{u,v} / \sqrt{\frac{1}{2^m} \sum_i \sum_j s_{i,j}^2} \qquad \text{(Equation 8)}$$

Here, the values of $\delta$ and $\Delta_u$, $\Delta_{u+1/u}$ are determined using a computer simulation so that the best BER is achieved.

Figure 14:
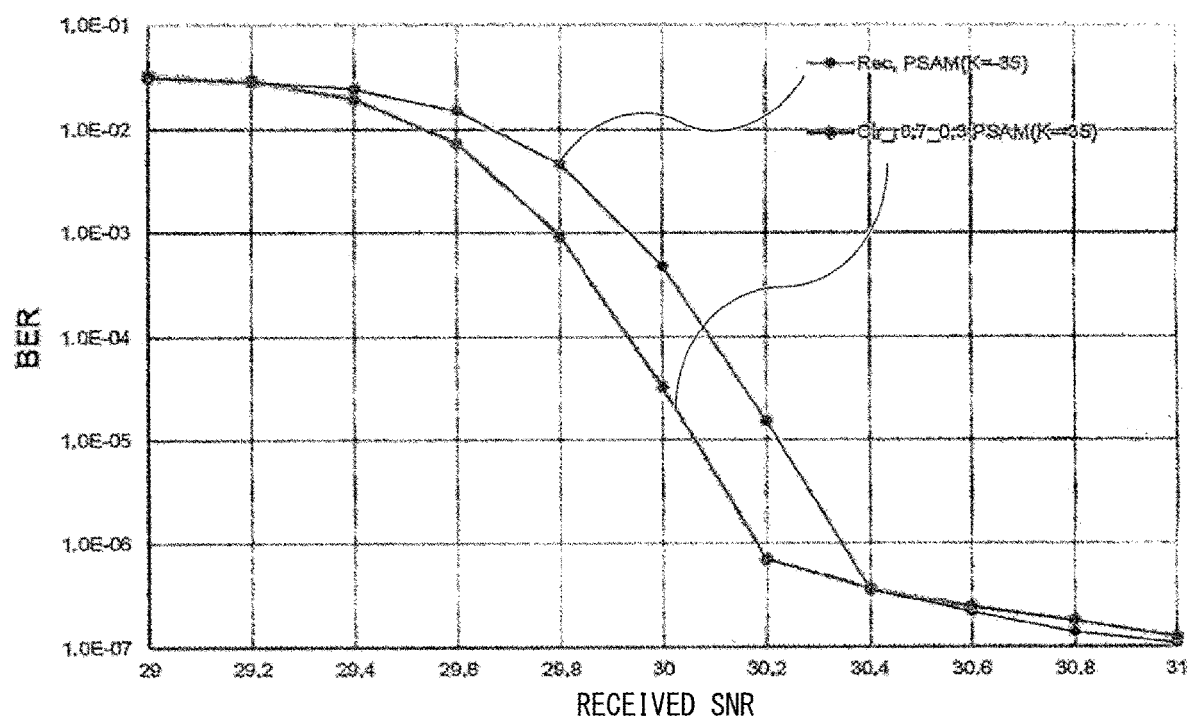
FIG. 14 is a diagram showing an example of BER characteristics with respect to received SNR in consideration of phase noise in Rectangular 1024 QAM and Circular 1024 QAM when the modulation method according to the present disclosure is used.

FIG. 14 is a diagram showing an example of BER characteristics with respect to received SNR in consideration of phase noise in Rectangular 1024 QAM and Circular 1024 QAM when the modulation method according to the present disclosure is used. FIG. 14 also shows characteristics of Rectangular 1024 QAM for comparison. In the case of Circular 1024 QAM, 4 bits represent the amplitude information, and 6 bits represent phase information. In this example, partial LDPC coding has been used. Among m=10 bits of the symbol label, the number of LDPC coded bits is n=4 bits. The lower 2 bits of the amplitude bits and the phase bits have been LDPC-coded. The phase noise has been approximated by an ARMA model, and the phase noise power level at 0 Hz is −35 dBc/Hz. An LDPC code has been used for the channel coding. The overall coding rate is R=9/10, and the actual coding rate of the channel coding bits is r=3/4. The Sum-Product decoding has been used for the decoding. As shown in FIG. 14, in the AWGN channel in which phase noise is taken into consideration, the required received SNR of the Circular 1024 QAM to satisfy BER of $10^{-5}$ is reduced by about 0.2 dB as compared with the Rectangular 1024 QAM.

According to the present disclosure, it is possible to achieve a modulation/demodulation method for Circular QAM, and a modulation device and a demodulation device which can improve BER in an AWGN channel in which phase noise is taken into consideration as compared with Rectangular QAM or Cross QAM.

Figure 15:
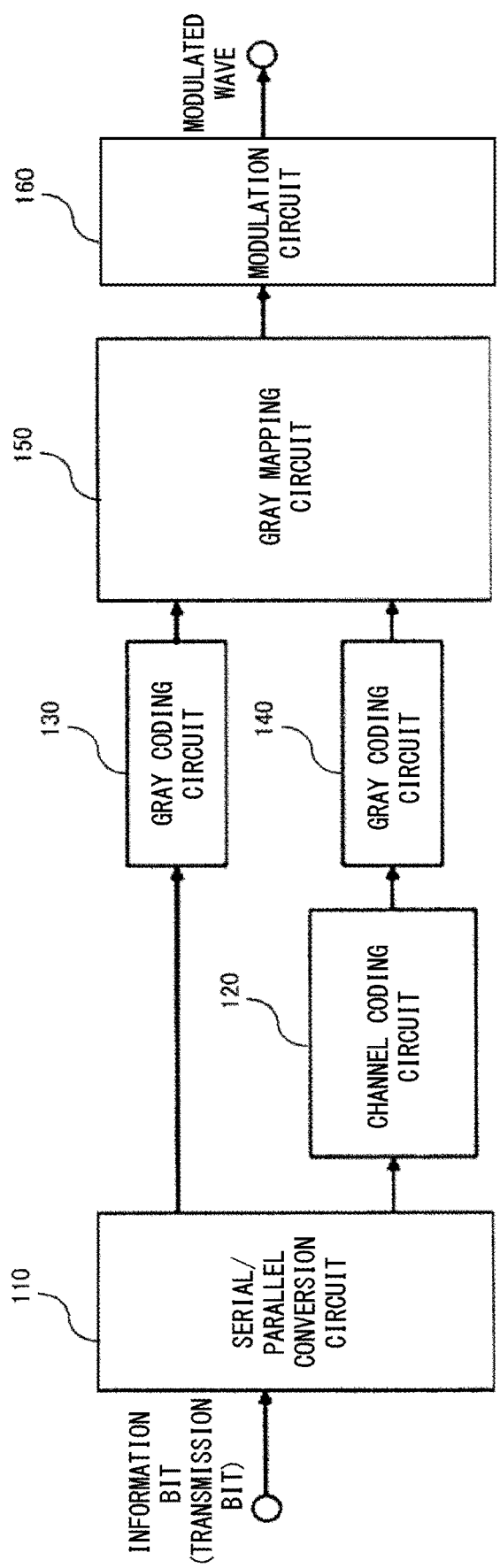
FIG. 15 is a diagram showing an embodiment of a modulation device according to the present disclosure.

FIG. 15 is a diagram showing an embodiment of the modulation device according to the present disclosure. In the embodiment shown in FIG. 15, the modulation device according to the present disclosure includes a serial/parallel conversion circuit 110, a channel coding circuit 120, gray coding circuits 130 and 140, a gray mapping circuit 150, and a modulation circuit 160. The serial/parallel conversion circuit 110 serial/parallel-converts the input information bits (transmission bits) into coded bits and uncoded bits. The channel coding circuit 120 performs channel coding on the coded bits output from the serial/parallel conversion circuit 110. The LDPC (Low Density Parity Check) coding or the like is used for channel coding. As described above, in the Circular QAM, channel coding is performed on the lower bits of the amplitude bits and the phase bits. The gray coding circuit 130 gray-codes the uncoded bits output from the serial/parallel conversion circuit 110 independently for the amplitude bits and the phase bits. The gray coding circuit 140 gray-codes the coded bits output from the channel coding circuit 120 independently for the amplitude bits and the phase bits. The gray mapping circuit 150 performs the above-described modulation method according to the present disclosure in which symbols of coded bits and uncoded bits are mapped to the respective symbol labels. The modulation circuit 160 inputs the symbol after the bit mapping into the modulation circuit, performs amplitude and phase modulation of a carrier signal, and generates a modulation wave.

Figure 16:
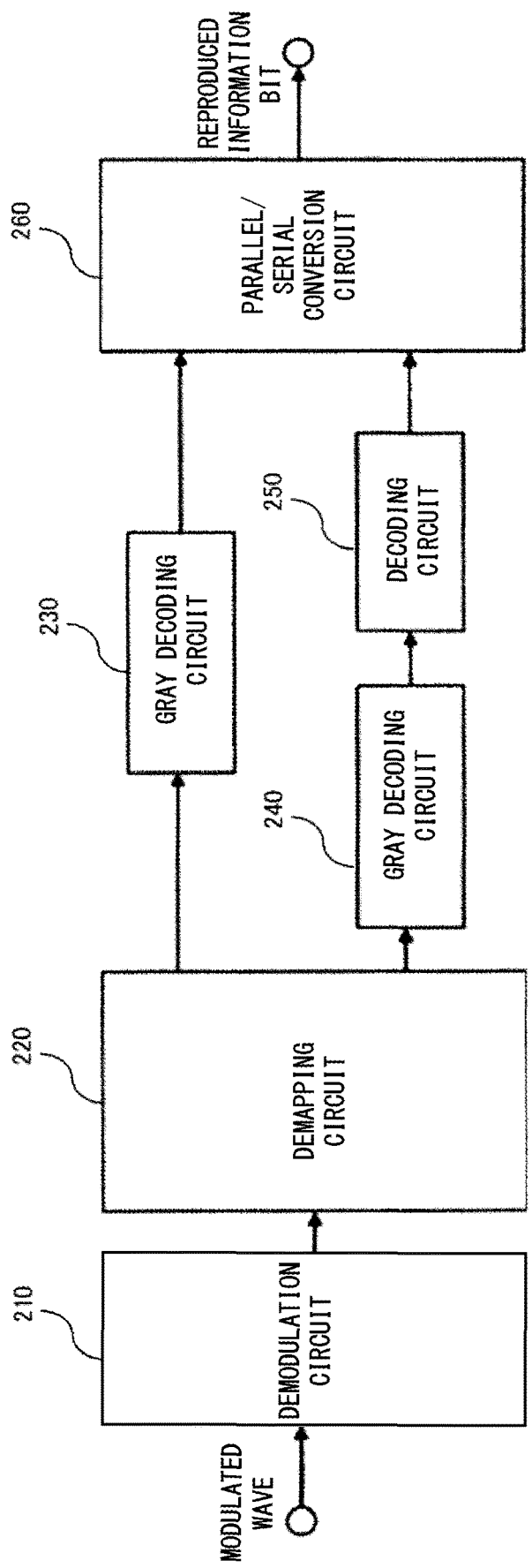
FIG. 16 is a diagram showing an embodiment of a demodulation device according to the present disclosure.

FIG. 16 is a diagram showing an embodiment of the demodulation device according to the present disclosure. In the embodiment shown in FIG. 16, the demodulation device according to the present disclosure includes a demodulation circuit 210, a demapping circuit 220, gray decoding circuits 230 and 240, a decoding circuit 250, and a parallel/serial conversion circuit 260. The demodulation circuit 210 demodulates an input modulation wave to generate a complex baseband signal. The demapping circuit 220 demaps the baseband signal output from the demodulation circuit 210, divides the signals into coded bits and uncoded bits, and outputs the divided bits. The gray decoding circuits 230 and 240 and the decoding circuit 250 perform error correction decoding on the lower coded bits of the amplitude bits and the phase bits. Then, a hard decision is made on a posteriori LLR (Log-Likelihood Ratio) of a decoder output, and symbol replica candidates are reduced based on a result of the hard decision on the coded bits. The LLR of the uncoded bits is calculated from the surviving symbol replica candidates and then the uncoded bits are obtained. As shown in FIG. 13, by reducing the number of symbol replica candidates based on the a posteriori LLR of the coded bits, the Euclidean distance between the surviving symbol replica candidates is increased. This reduces decoding errors of the uncoded bits. The parallel/serial conversion circuit 260 parallel/serial-converts the uncoded bits output from the gray decoding circuit 230 and the coded bits output from the decoding circuit 250 to reproduce transmission information bits.

Figure 17:
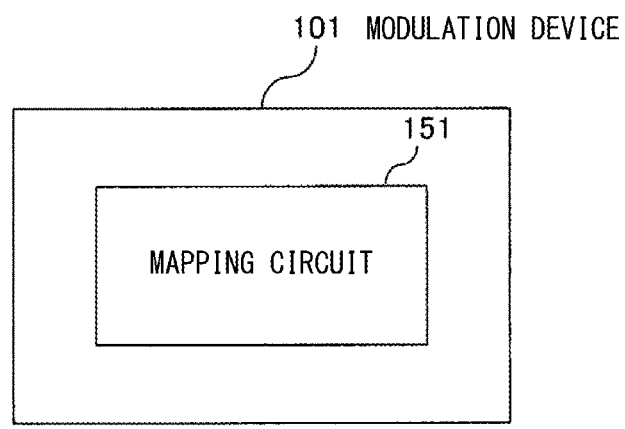
FIG. 17 is a diagram showing another embodiment of the modulation device according to the present disclosure.

FIG. 17 is a diagram showing another embodiment of the modulation device according to the present disclosure. The modulation device 101 in this embodiment includes a mapping circuit 151 as shown in FIG. 17. FIG. 17 shows an example of the main components related to this embodiment among the components included in the modulation device 101 according to the present disclosure.

The mapping circuit 151 maps the information bits to signal points on a plurality of concentric rings. The mapping circuit 151 reduces the number of signal points on the innermost ring or a plurality of rings from the inner to outer rings using the signal space arrangement in which the number of signal points on all of the plurality of rings are the same as a basis, and generates a new ring outside the signal space arrangement used as the basis. The mapping circuit 151 arranges, on the generated ring, the signal points that achieve the same frequency utilization efficiency as that of the signal space arrangement used as the basis.

Figure 18:
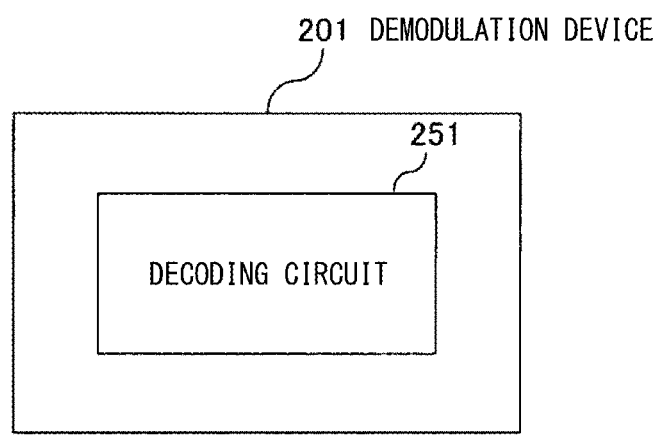
FIG. 18 is a diagram showing another embodiment of the demodulation device according to the present disclosure.

FIG. 18 is a diagram showing another embodiment of the demodulation device according to the present disclosure.

The demodulation device 201 according to this embodiment includes a decoding circuit 251 as shown in FIG. 18. FIG. 18 shows an example of the main components related to this embodiment among the components included in the demodulation device 201 according to the present disclosure.

For signals modulated using the method for mapping information bits to signal points on concentric rings, the decoding circuit 251 uses an error correction decoder to perform error correction decoding on the lower $n_a$ bits of the amplitude bit and the lower $n_p$ bits of the phase bits of the modulated signals. The decoding circuit 251 reduces the symbol replica candidates based on the a posteriori log-likelihood ratio of the information bits and parity check bits output from the error correction decoder. The decoding circuit 251 obtains the upper $(m_a-n_a)$ bits of the uncoded bits of the amplitude bits and the upper uncoded bits $(m_p-n_p)$ of the phase bits for the reduced symbol replica candidates.

Although the explanations have been made with the functions (processes) allocated to the respective components, these allocations are not limited to the above. Further, the above-described embodiments of the configuration of the components are merely examples, and the present disclosure is not limited to them.

Thus, an object of the present disclosure is to provide a constellation which can improve BER when phase noise is taken into consideration as compared with Rectangular QAM or Cross QAM constellation employed in a wireless backhaul.

The present disclosure is not limited to the above embodiment, and can be modified and implemented in various ways. In the embodiment described above, the size, shape, and the like illustrated in the attached drawings are not limited thereto, and various modifications can be made within the scope of the effects of the present disclosure. In addition, the embodiment according to the present disclosure can be modified as appropriate without departing from the scope of the object of the present disclosure.

The whole or part of the embodiments disclosed above can be described as, but not limited to, the following supplementary notes.

(Supplementary Note 1)

A modulation method for mapping information bits to signal points on a plurality of concentric rings, the modification method comprising:

when a signal space arrangement in which the number of signal points on all of the plurality of rings is the same is used as a basis, reducing the number of signal points on an innermost ring or a plurality of rings from inner to outer rings from among the plurality of rings;

generating a new ring outside the signal space arrangement used as the basis; and arranging, on the generated ring, signal points which achieve the same frequency utilization efficiency as that of the signal space arrangement used as the basis.

(Supplementary Note 2)

The modulation method according to Supplementary note 1, wherein the modulation method includes a signal space arrangement in which bits representing a label of the signal points are divided into bits representing phase information and bits representing amplitude information, and when the number of bits representing the phase information is denoted by $m_p$, the number of signal points on each ring is obtained from Formula 42, while when the number of bits representing the amplitude information is denoted by $m_a$, the number of the rings is obtained from Formula 43.

$$2^{m_p} \quad \text{[Formula 42]}$$

$$2^{m_a} \quad \text{[Formula 43]}$$

(Supplementary Note 3)

The modulation method according to Supplementary note 2, further comprising determining the number of signal points, the number of which is obtained from Formula 44, on the ring so that a satisfactory bit error rate for phase noise can be achieved.

$$2^{m_p} \quad \text{[Formula 44]}$$

(Supplementary Note 4)

The modulation method according to Supplementary note 1, wherein in order to reduce the number of signal points on the innermost ring or the plurality of rings from the inner to outer rings, the number of signal points on $2^h$ rings is reduced to the number of signal points obtained from Formula 46, which is a power of two, in a direction extending from the innermost ring toward the outside from among the rings, the number of which is obtained from Formula 45, and the total number of signal points on the $2^h$ rings each having the signal points, the number of which is obtained from Formula 6, is set so that it becomes the number obtained from Formula 7 ($\lambda$ is an integer of 1 or more).

$$2^{m_a} \quad \text{[Formula 45]}$$

$$2^a = 2^{m_p - h} \quad \text{[Formula 46]}$$

$$2^{m_p - h} \quad \text{[Formula 47]}$$

$$\lambda \times 2^{m_p} \quad \text{[Formula 48]}$$

(Supplementary Note 5)

The modulation method according to Supplementary note 1, wherein in order to reduce the number of signal points on the innermost ring or the plurality of rings from the inner to outer rings, the number of signal points on $2^h$ rings is reduced to the number of signal points obtained from Formula 50, which is a power of two, in a direction extending from the innermost ring toward the outside from among the rings, the number of which is obtained from Formula 49, and the total number of signal points on the $2^h$ rings each having the signal points, the number of which is obtained from Formula 51, is set so that it becomes the number obtained from Formula 52 ($\lambda$ is an integer of 1 or more and $\beta$ and $\gamma$ are integers).

[Formula 49]
$$2^{m_a}$$

[Formula 50]
$$2^a = 2^{m_p - h}$$

[Formula 51]
$$2^{m_p - h}$$

[Formula 52]
$$\lambda = \frac{\beta}{\gamma} \times 2^{m_p}$$

(Supplementary Note 6)

The modulation method according to Supplementary note 1, wherein when a ring is newly generated outside the signal space arrangement used as the basis and signal points are arranged on the generated ring, the number of the signal points arranged on the generated ring is set to be the same as the number of signal points on each ring of the signal space arrangement used as the basis.

(Supplementary Note 7)

The modulation method according to Supplementary note 1, wherein when a ring is newly generated outside the signal space arrangement used as the basis and signal points are arranged on the generated ring, the number of the signal points arranged on the generated ring is set as a value different from the number of signal points on the ring of the signal space arrangement used as the basis.

(Supplementary Note 8)

The modulation method according to Supplementary note 6 or 7, wherein when the ring is newly generated outside the signal space arrangement used as the basis, a bit mapping of the signal points on the generated ring is replaced so that a Euclidean distance of phase bits between the signal points on the same phase of different rings is reduced.

(Supplementary Note 9)

The modulation method according to Supplementary note 6 or 7, wherein when the ring is newly generated outside the signal space arrangement used as the basis, a bit mapping of the signal points on the generated ring is replaced so that a distance between the signal points having the same lower coded bits in bits representing phase information is increased.

(Supplementary Note 10)

The modulation method according to Supplementary note 1, wherein when the information bits are mapped to the signal points on the plurality of concentric rings, all ring amplitude ratios are set to be the same.

(Supplementary Note 11)

The modulation method according to Supplementary note 1, wherein when the information bits are mapped to the signal points on the plurality of concentric rings, the rings are grouped into a plurality of sets of rings in which the signal points on the rings belonging to the same set are the same as each other, and ring amplitude ratios are set to be the same for the rings belonging to the same set, and the ring amplitude ratios between the set of rings having different number of signal points and the ring amplitude ratios of the rings belonging to the set of rings having a different number of signal points are set to be different from each other.

(Supplementary Note 12)

The modulation method according to Supplementary note 1, wherein when the information bits are mapped to the signal points on the plurality of concentric rings, among $m_a$ bits representing amplitude information and $m_p$ bits representing phase information, $(n_a + n_p)$ bits, which is a sum of lower $n_a$ bits of amplitude bits and $n_p$ bits of phase bits, are subjected to channel coding regardless of the number of signal points on each ring, and the channel coding is not performed on remaining $(m_a - n_a) + (m_p - n_p)$ bits.

(Supplementary Note 13)

The modulation method according to Supplementary note 1, when the information bits are mapped to the signal points on the plurality of concentric rings, double gray mapping is performed independently on amplitude bits and phase bits.

(Supplementary Note 14)

A decoding method comprising:

for a signal modulated using a method for mapping information bits to signal points on a plurality of concentric rings, performing error correction decoding on $(n_a-n_p)$ bits, which are a difference between lower $n_a$ bits of amplitude bits of the signal and $n_p$ bits of phase bits of the signal;

reducing symbol replica candidates based on a posteriori log-likelihood ratio of the information bits and parity check bits output from an error correction decoder; and obtaining upper uncoded $(m_a-n_a)$ bits of the amplitude bits and upper uncoded $(m_p-n_p)$ bits of the phase bits for the reduced symbol replica candidates.

(Supplementary Note 15)

A modulation device comprising a mapping circuit configured to map information bits to signal points on a plurality of concentric rings, when a signal space arrangement in which the number of signal points on all of the plurality of rings is the same is used as a basis, reduce the number of signal points on an innermost ring or a plurality of rings from inner to outer rings from among the plurality of rings, generate a new ring outside the signal space arrangement used as the basis, and arrange, on the generated ring, signal points which achieve the same frequency utilization efficiency as that of the signal space arrangement used as the basis.

(Supplementary Note 16)

A demodulation device comprising a decoding circuit configured to, for a signal modulated using a method for mapping information bits to signal points on a plurality of concentric rings, perform error correction decoding on lower $n_a$ bits of amplitude bits of the signal and lower $n_p$ bits of phase bits of the signal using an error correction decoder, reduce symbol replica candidates based on a posteriori log-likelihood ratio of the information bits and parity check bits output from the error correction decoder, and obtain upper uncoded $(m_a-n_a)$ bits of the amplitude bits and upper uncoded $(m_p-n_p)$ bits of the phase bits for the reduced symbol replica candidates.

The invention claimed is:

1. A modulation method for mapping information bits to signal points on a plurality of concentric rings, the modification method comprising:

when a signal space arrangement in which the number of signal points on all of the plurality of rings is the same is used as a basis, reducing the number of signal points on an innermost ring or a plurality of rings from inner to outer rings from among the plurality of rings;

generating a new ring outside the signal space arrangement used as the basis; and arranging, on the generated ring, signal points which achieve the same frequency utilization efficiency as that of the signal space arrangement used as the basis.

2. The modulation method according to claim 1, wherein the modulation method includes a signal space arrangement in which bits representing a label of the signal points are divided into bits representing phase information and bits representing amplitude information, and when the number of bits representing the phase information is denoted by $m_p$, the number of signal points on each ring is obtained from $2^{m_p}$, while when the number of bits representing the amplitude information is denoted by $m_a$, the number of the rings is obtained from $2^{m_a}$.

3. The modulation method according to claim 2, further comprising determining the number of signal points, the number of which is obtained from $2^{m_p}$, on the ring so that a satisfactory bit error rate for phase noise can be achieved.

4. The modulation method according to claim 1, wherein in order to reduce the number of signal points on the innermost ring or the plurality of rings from the inner to outer rings, the number of signal points on $2^h$ rings is reduced to the number of signal points obtained from $2^\alpha=2^{m_p-h}$, which is a power of two, in a direction extending from the innermost ring toward the outside from among the rings, the number of which is obtained from $2^{m_a}$, and the total number of signal points on the $2^h$ rings each having the signal points, the number of which is obtained from $2^{m_p-h}$, is set so that it becomes the number obtained from $\lambda \times 2^{m_p}$ ($\lambda$ is an integer of 1 or more).

5. The modulation method according to claim 1, wherein in order to reduce the number of signal points on the innermost ring or the plurality of rings from the inner to outer rings, the number of signal points on $2^h$ rings is reduced to the number of signal points obtained from $2^\alpha=2^{m_p-h}$, which is a power of two, in a direction extending from the innermost ring toward the outside from among the rings, the number of which is obtained from $2^{m_a}$, and the total number of signal points on the $2^h$ rings each having the signal points, the number of which is obtained from $2^{m_p-h}$, is set so that it becomes the number obtained from $$\lambda = \frac{\beta}{\gamma} \times 2^{m_p}$$

($\lambda$ is an integer of 1 or more and $\beta$ and $\gamma$ are integers).

6. The modulation method according to claim 1, wherein when a ring is newly generated outside the signal space arrangement used as the basis and signal points are arranged on the generated ring, the number of the signal points arranged on the generated ring is set to be the same as the number of signal points on each ring of the signal space arrangement used as the basis.

7. The modulation method according to claim 6, wherein when the ring is newly generated outside the signal space arrangement used as the basis, a bit mapping of the signal points on the generated ring is replaced so that a Euclidean distance of phase bits between the signal points on the same phase of different rings is reduced.

8. The modulation method according to claim 6, wherein when the ring is newly generated outside the signal space arrangement used as the basis, a bit mapping of the signal points on the generated ring is replaced so that a distance between the signal points having the same lower coded bits in bits representing phase information is increased.

9. The modulation method according to claim 1, wherein when a ring is newly generated outside the signal space arrangement used as the basis and signal points are arranged on the generated ring, the number of the signal points arranged on the generated ring is set as a value different from the number of signal points on the ring of the signal space arrangement used as the basis.

10. The modulation method according to claim 1, wherein when the information bits are mapped to the signal points on the plurality of concentric rings, all ring amplitude ratios are set to be the same.

11. The modulation method according to claim 1, wherein when the information bits are mapped to the signal points on the plurality of concentric rings, the rings are grouped into a plurality of sets of rings in which the signal points on the rings belonging to the same set are the same as each other, and ring amplitude ratios are set to be the same for the rings belonging to the same set, and the ring amplitude ratios between the set of rings having different number of signal points and the ring amplitude ratios of the rings belonging to the set of rings having a different number of signal points are set to be different from each other.

12. The modulation method according to claim 1, wherein when the information bits are mapped to the signal points on the plurality of concentric rings, among $m_a$ bits representing amplitude information and $m_p$ bits representing phase information, $(n_a+n_p)$ bits, which is a sum of lower $n_a$ bits of amplitude bits and $n_p$ bits of phase bits, are subjected to channel coding regardless of the number of signal points on each ring, and the channel coding is not performed on remaining $(m_a-n_a)+(m_p-n_p)$ bits.

13. The modulation method according to claim 1, when the information bits are mapped to the signal points on the plurality of concentric rings, double gray mapping is performed independently on amplitude bits and phase bits.

14. A decoding method comprising:

for a signal modulated using a method for mapping information bits to signal points on a plurality of concentric rings, performing error correction decoding on $(n_a-n_p)$ bits, which are a difference between lower $n_a$ bits of amplitude bits of the signal and $n_p$ bits of phase bits of the signal;

reducing symbol replica candidates based on a posteriori log-likelihood ratio of the information bits and parity check bits output from an error correction decoder; and obtaining upper uncoded $(m_a-n_a)$ bits of the amplitude bits and upper uncoded $(m_p-n_p)$ bits of the phase bits for the reduced symbol replica candidates.

15. A modulation device comprising a mapping circuit configured to map information bits to signal points on a plurality of concentric rings, when a signal space arrangement in which the number of signal points on all of the plurality of rings is the same is used as a basis, reduce the number of signal points on an innermost ring or a plurality of rings from inner to outer rings from among the plurality of rings, generate a new ring outside the signal space arrangement used as the basis, and arrange, on the generated ring, signal points which achieve the same frequency utilization efficiency as that of the signal space arrangement used as the basis.

* * * * *